United States Patent
Ingale et al.

(10) Patent No.: US 11,864,038 B2
(45) Date of Patent: Jan. 2, 2024

(54) METHOD AND USER EQUIPMENT FOR PERFORMING INITIAL BEAM ALIGNMENT DURING RANDOM ACCESS (RACH) PROCEDURE

(71) Applicant: Samsung Electronics Co., Ltd, Suwon-si (KR)

(72) Inventors: Mangesh Abhimanyu Ingale, Yongin-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/496,294

(22) PCT Filed: Mar. 22, 2018

(86) PCT No.: PCT/KR2018/003382
§ 371 (c)(1),
(2) Date: Sep. 20, 2019

(87) PCT Pub. No.: WO2018/174609
PCT Pub. Date: Sep. 27, 2018

(65) Prior Publication Data
US 2020/0053607 A1     Feb. 13, 2020

(30) Foreign Application Priority Data

Mar. 22, 2017  (IN) .............................. 201741010064
Mar. 21, 2018  (IN) .............................. 201741010064

(51) Int. Cl.
H04W 36/00  (2009.01)
H04W 36/08  (2009.01)
H04W 74/08  (2009.01)

(52) U.S. Cl.
CPC ... *H04W 36/0072* (2013.01); *H04W 36/0058* (2018.08); *H04W 36/08* (2013.01); *H04W 74/0833* (2013.01)

(58) Field of Classification Search
CPC ......... H04W 36/0072; H04W 36/0058; H04W 36/08; H04W 74/0833; H04W 36/0088;
(Continued)

(56) References Cited

U.S. PATENT DOCUMENTS 9,326,178 B2    4/2016  Jung et al.
2012/0177006 A1  7/2012  Tsai et al.
(Continued)

FOREIGN PATENT DOCUMENTS

CN    102740385 A    10/2012
CN    102740447 A    10/2012
(Continued)

OTHER PUBLICATIONS

International Search Report dated Sep. 20, 2018 in connection with International Patent Application No. PCT/KR2018/003382, 3 pages.
(Continued)

*Primary Examiner* — Ricardo H Castaneyra

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein disclose a method and system for performing initial beam alignment during a random access (RACH) procedure by a User Equipment (UE).

10 Claims, 13 Drawing Sheets

(58) Field of Classification Search
CPC .... H04W 36/30; H04W 56/00; H04L 5/0092; H04L 5/005; H04L 5/0053
See application file for complete search history.

(56) References Cited

U.S. PATENT DOCUMENTS

| | | | |
|---|---|---|---|
| 2012/0214538 A1 | 8/2012 | Kim et al. | |
| 2012/0287902 A1* | 11/2012 | Bufe | H04W 36/38 370/331 |
| 2013/0077513 A1 | 3/2013 | Ng et al. | |
| 2013/0210434 A1 | 8/2013 | Dimou et al. | |
| 2013/0301439 A1 | 11/2013 | Heo et al. | |
| 2013/0301567 A1 | 11/2013 | Jeong et al. | |
| 2013/0344868 A1 | 12/2013 | Yamada | |
| 2014/0177601 A1* | 6/2014 | Nishio | H04W 76/27 370/332 |
| 2014/0362793 A1 | 12/2014 | Chai et al. | |
| 2014/0369242 A1 | 12/2014 | Ng et al. | |
| 2015/0092768 A1* | 4/2015 | Ng | H04W 48/16 370/350 |
| 2015/0103800 A1 | 4/2015 | Seo et al. | |
| 2015/0189574 A1 | 7/2015 | Ng et al. | |
| 2015/0223245 A1* | 8/2015 | Cheng | H04J 11/0069 370/329 |
| 2016/0057800 A1 | 2/2016 | Ingale et al. | |
| 2016/0157194 A1 | 6/2016 | Svedman et al. | |
| 2016/0242164 A1 | 8/2016 | Chmiel et al. | |
| 2016/0278129 A1 | 9/2016 | Lopez-Perez et al. | |
| 2017/0118728 A1 | 4/2017 | Harada et al. | |
| 2018/0007574 A1 | 1/2018 | Park et al. | |
| 2018/0198585 A1* | 7/2018 | Lin | H04B 7/0617 |
| 2019/0215119 A1* | 7/2019 | Kim | H04L 1/0027 |
| 2019/0238270 A1* | 8/2019 | Pan | H03M 13/09 |
| 2020/0029229 A1* | 1/2020 | Harada | H04W 16/28 |
| 2021/0051502 A1* | 2/2021 | Yamada | H04W 24/10 |

FOREIGN PATENT DOCUMENTS

| | | |
|---|---|---|
| CN | 103108405 A | 5/2013 |
| CN | 103385026 A | 11/2013 |
| CN | 104285385 A | 1/2015 |
| CN | 104285471 A | 1/2015 |
| CN | 105340196 A | 2/2016 |
| CN | 105594141 A | 5/2016 |
| CN | 105684514 A | 6/2016 |
| CN | 105794295 A | 7/2016 |
| CN | 105850189 A | 8/2016 |
| CN | 106105290 A | 11/2016 |
| EP | 2988544 A1 | 2/2016 |
| JP | 6086546 B2 | 3/2017 |
| KR | 10-2013-0125903 A | 11/2013 |
| WO | 2012/115445 A2 | 8/2012 |
| WO | 2013/170209 A1 | 11/2013 |
| WO | 2015/003019 A1 | 1/2015 |
| WO | 2015/055271 A1 | 4/2015 |
| WO | 2016122232 A1 | 8/2016 |
| WO | 2017/027807 A2 | 2/2017 |

OTHER PUBLICATIONS

Written Opinion of the International Searching Authority dated Sep. 20, 2108 in connection with International Patent Application No. PCT/KR2018/003382, 6 pages.
Examination report in connection with Indian Application No. 201741010064 dated May 13, 2020, 6 pages.
Samsung, "CSI-RS for beam management", 3GPP TSG RAN WG1 #88, Feb. 13-17, 2017, R1-17002955, 5 pages.
Sony, "Considerations on Multiple Beams RACH Procedure", 3GPP TSG RAN WG1 Meeting #87, Nov. 14-18, 2016, R1-1612890, 4 pages.
Supplementary European Search Report dated Feb. 5, 2020 in connection with European Patent Application No. 18 77 2447, 9 pages.
The First Office Action dated May 8, 2021 in connection with Chinese Application No. 201880019763.7, 24 pages.
Samsung, "CSI-RS for beam management," R1-17002955, 3GPP TSG RAN WG1#88, Athens, Greece, Feb. 13-17, 2017, 5 pages.
Korean Intellectual Property Office, "Decision of Patent," dated Oct. 13, 2022, in connection with Korean Patent Application No. 10-2019-7031182, 9 pages.
China National Intellectual Property Administration, "Notification of the Decision to Grant," dated Jul. 20, 2022, in connection with Chinese Patent Application No. 201880019763.7, 12 pages.
Xiangyang et al., "Research on and analysis of TD-LTE random access process," Study on Optical Communications, Apr. 2010, 6 pages.
NTT Docomo et al., "Introduction of Dual Connectivity," 3GPP TSG-RAN WG2 Meeting #88, R2-145410, San Francisco, USA Nov. 17-21, 2014, 66 pages.
Huawei, "Running 36.300 CR to capture agreements on NB-IoT," 3GPP TSG-RAN WG2 Meeting #92, R2-157187, Anaheim, USA, Nov. 16-20, 2015, 18 pages.
Huawei et al., "Discussion on downlink beam measurement and UE reporting procedure," 3GPP TSG RAN WG1 NR Ad hoc Meeting, R1-1700039, Spokane, USA, Jan. 16-20, 2017, 10 pages.
Nokia et al., "DL Signals for Mobility Measurements in NR", 3GPP TSG RAN WG1 NR AH Meeting, R1-1701063, Spokane, USA, Jan. 16-20, 2017, 11 pages.
3GPP TR 38.912 V14.0.0 (Mar. 2017); Technical Specification; 3rd Generation Partnership Project; Technical Specification Group Radio Access Network; Study on New Radio (NR) access technology (Release 14); 74 pages.
Hearing Notice in Reference in connection to Indian Patent Application No. 201741010064 dated Aug. 10, 2023, 2 pages.
Hearing adjournment notice in connection to Indian Patent Application No. 201741010064 dated Aug. 28, 2023, 2 pages.

* cited by examiner

[Fig. 1]
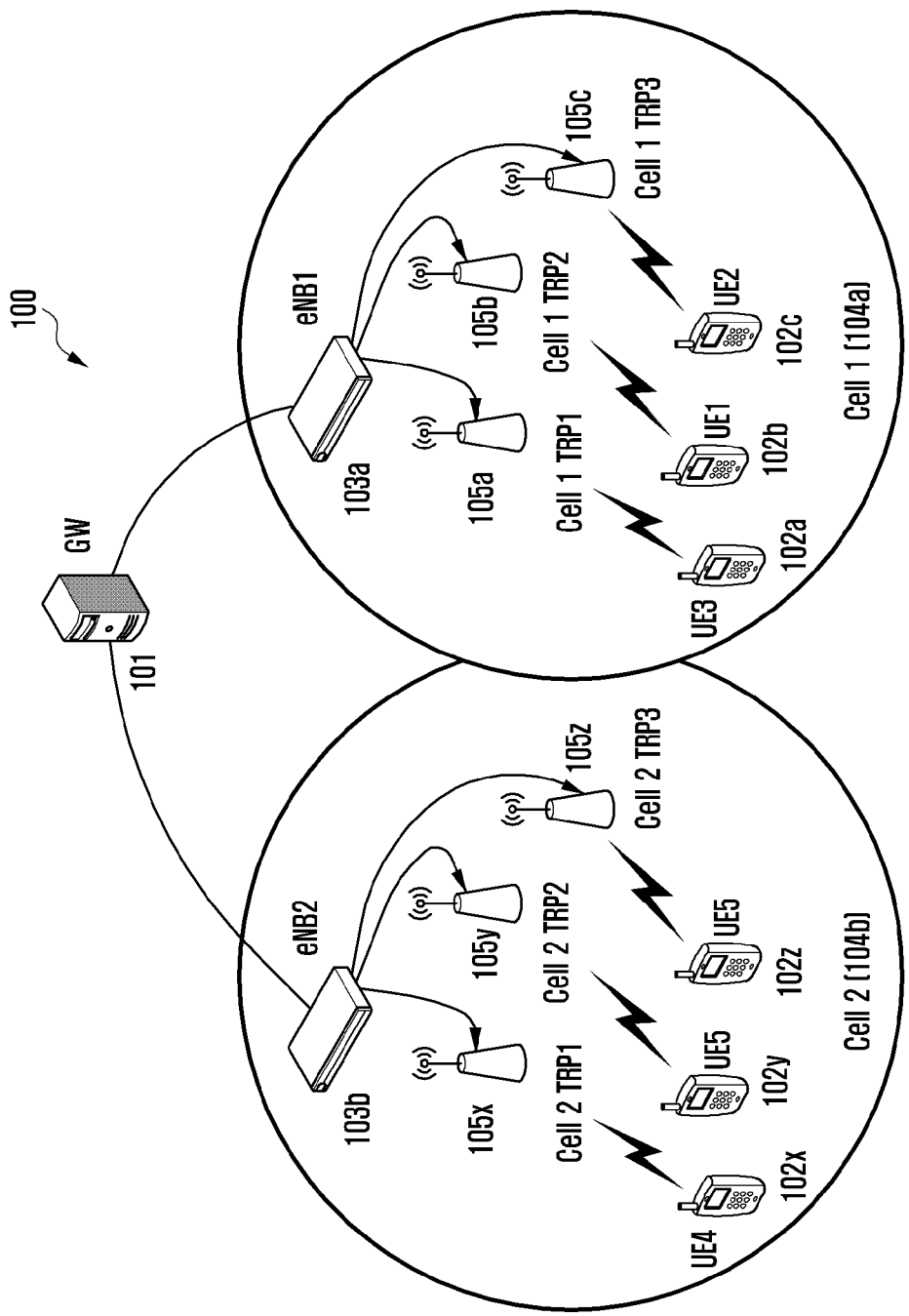

[Fig. 2A]
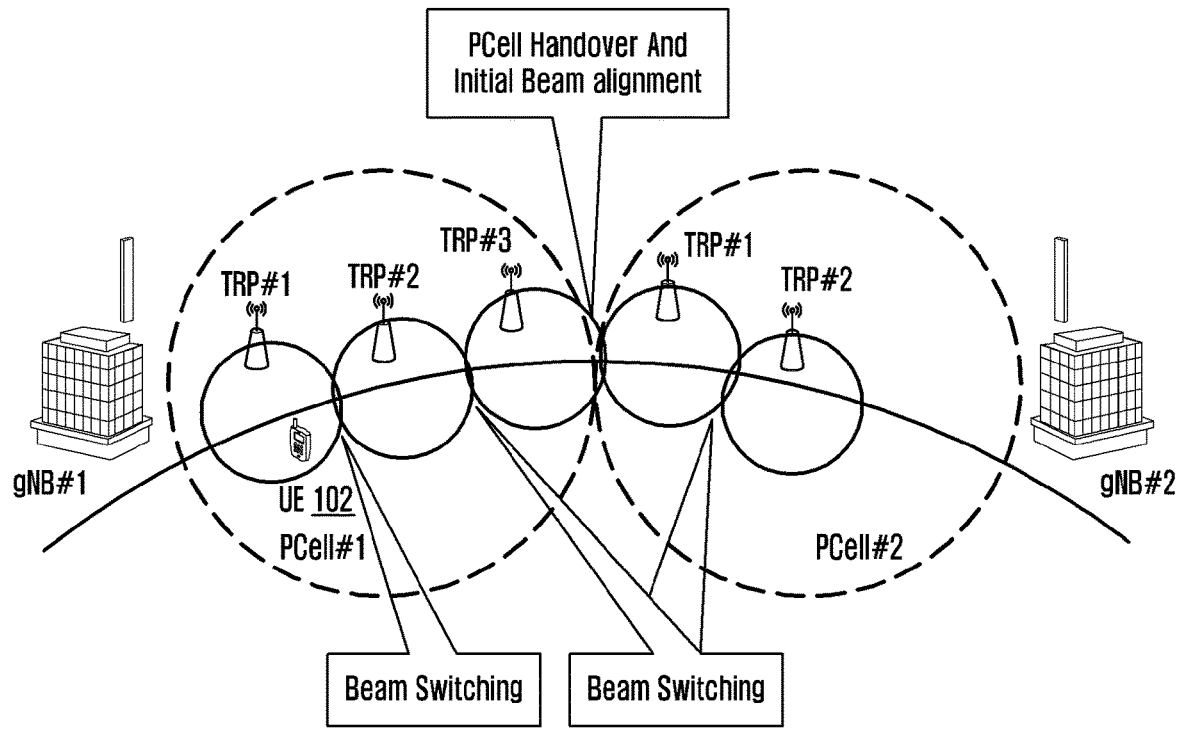
[Fig. 2B]
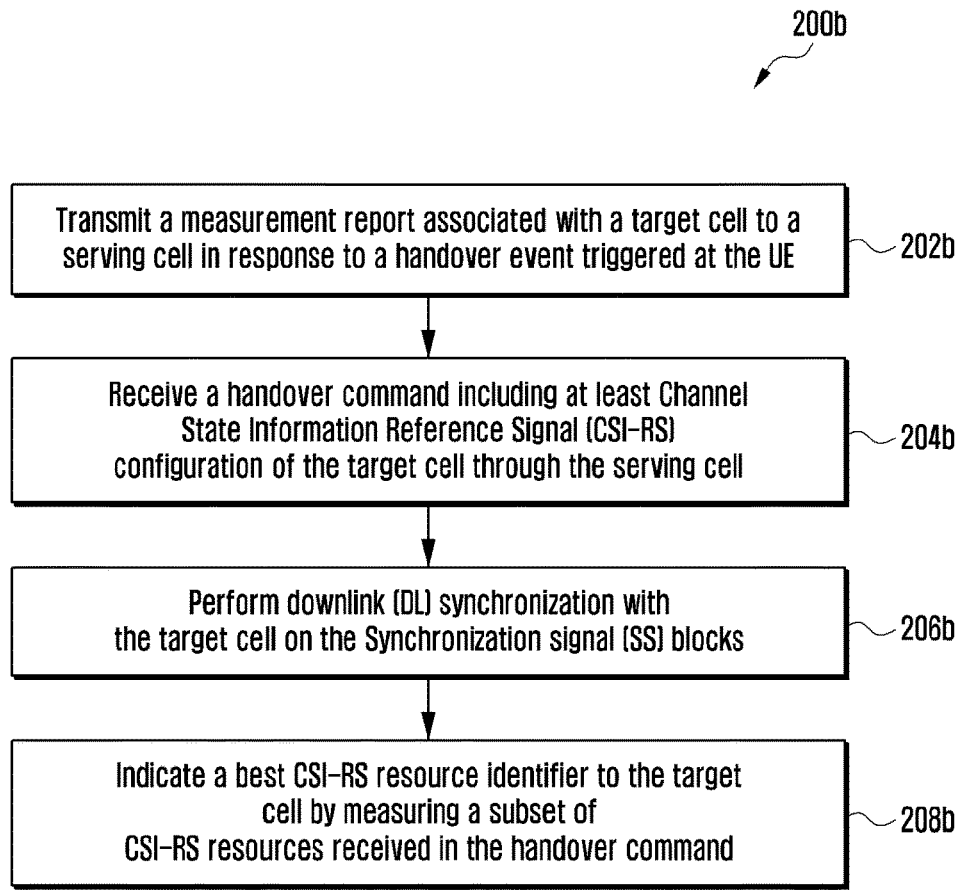

[Fig. 2C]
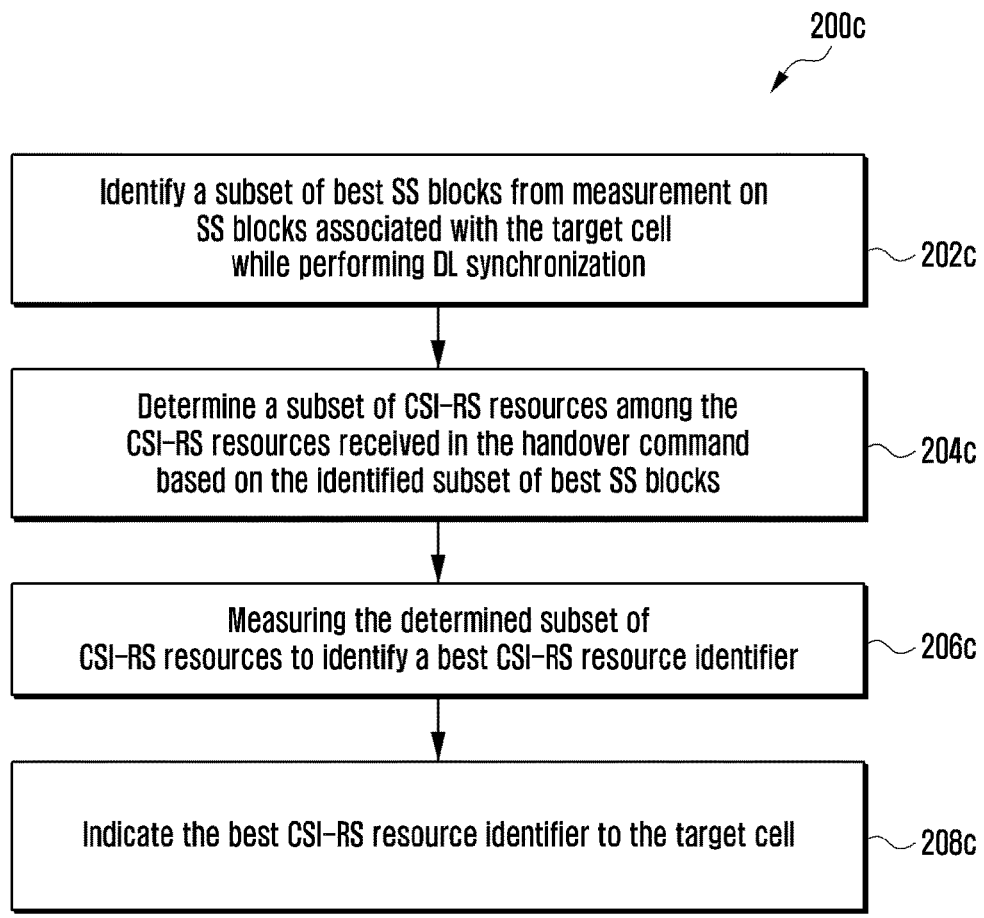

[Fig. 3]
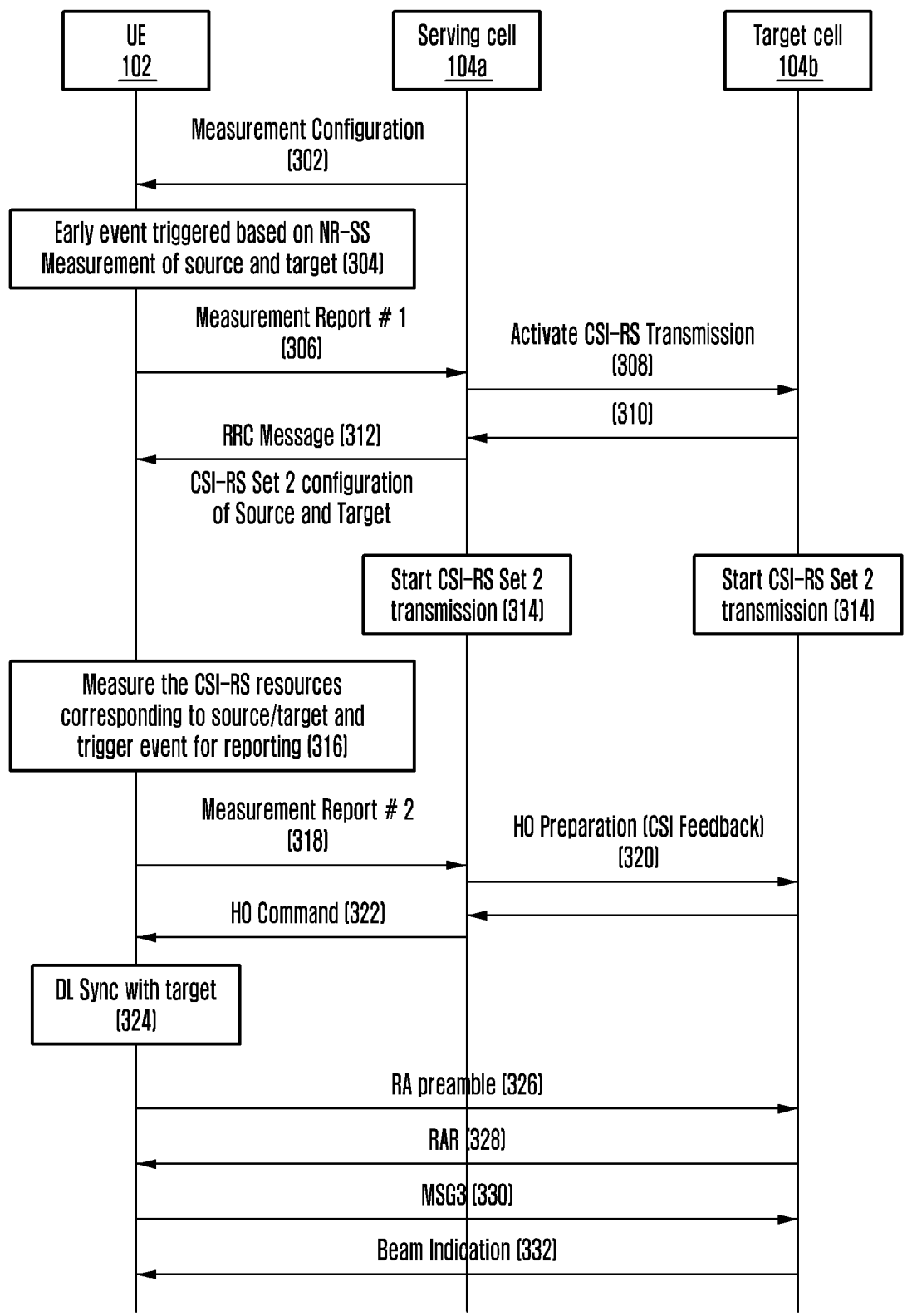

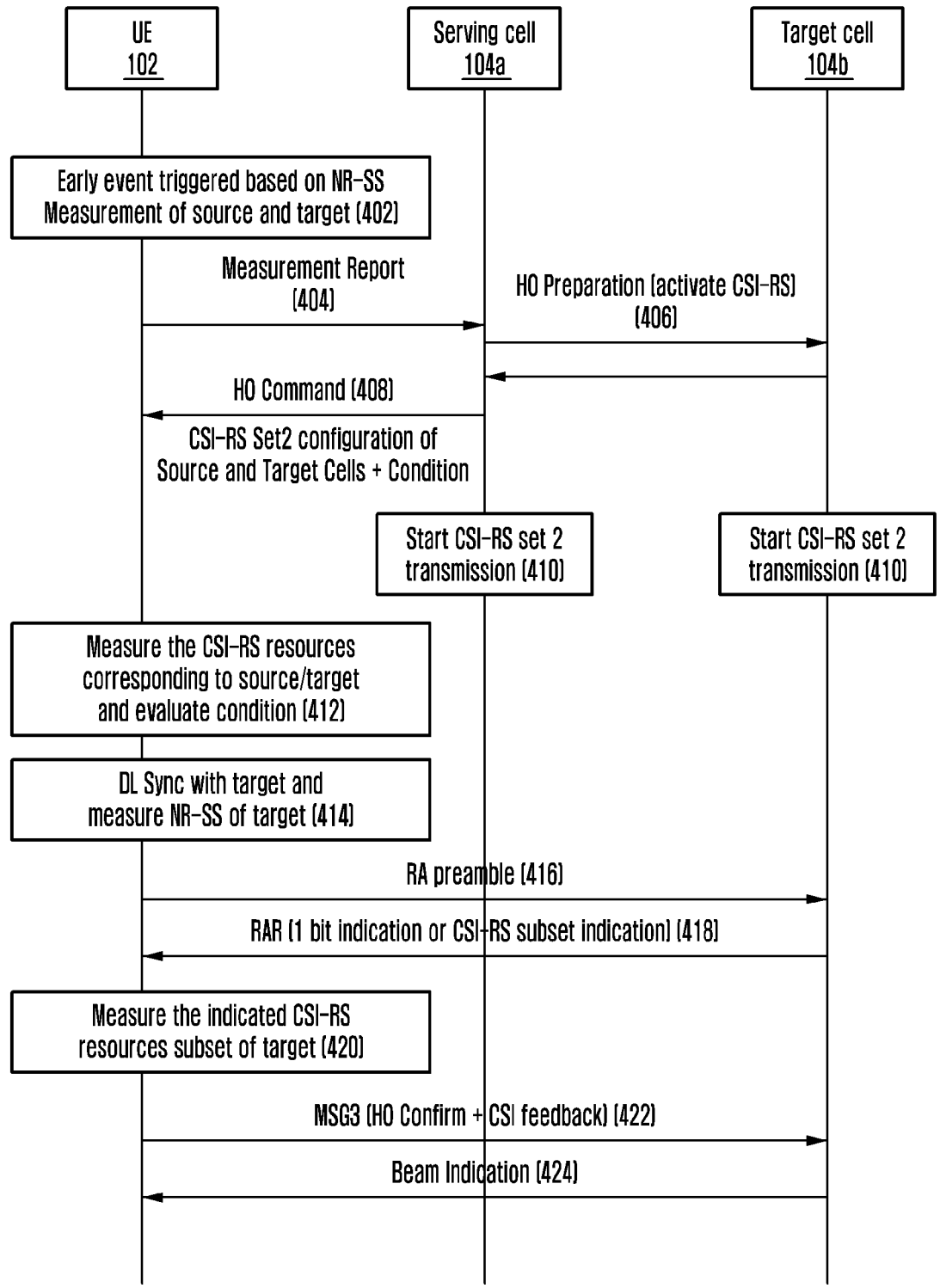

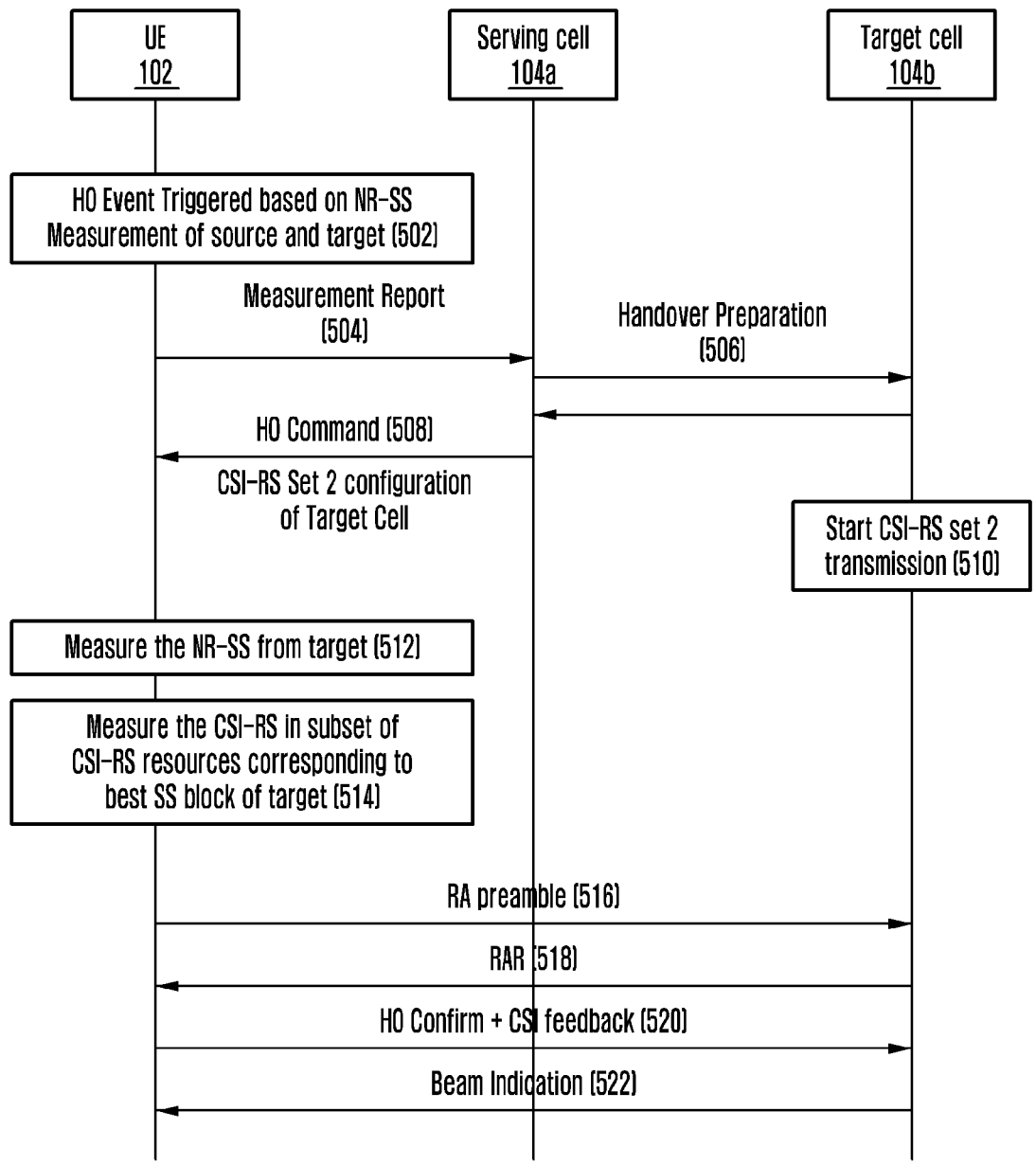
[Fig. 5]

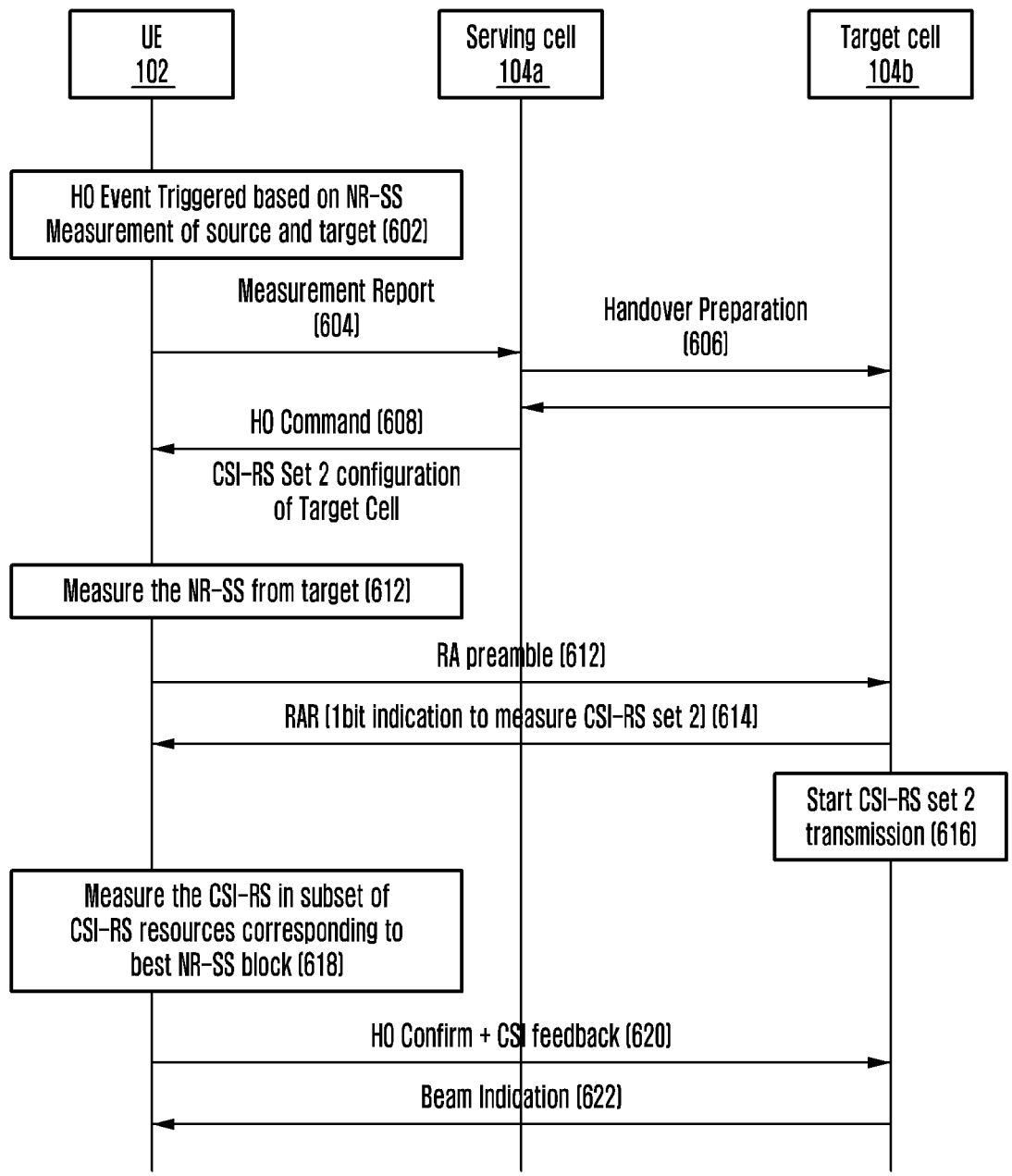
[Fig. 6]

[Fig. 7]
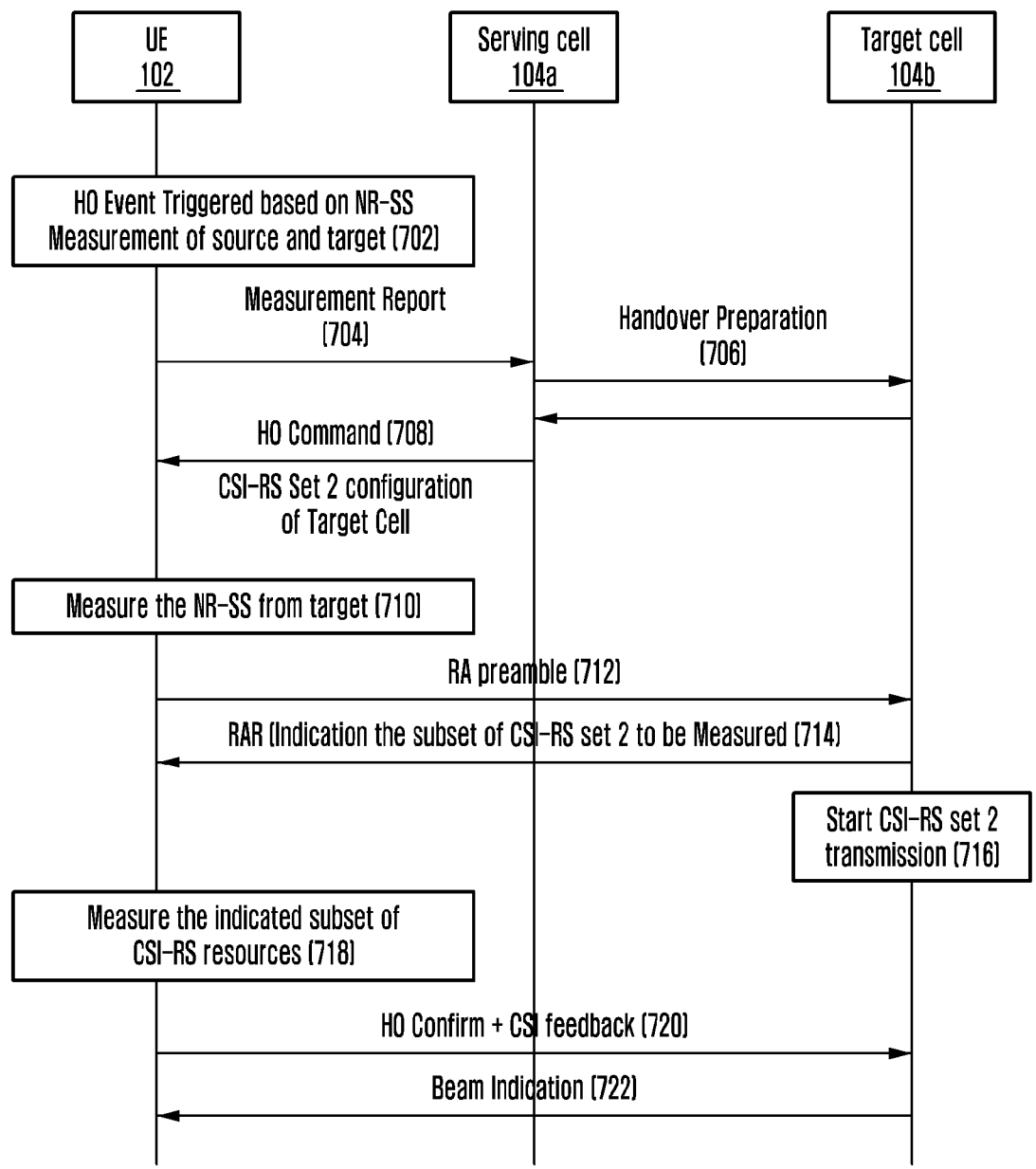

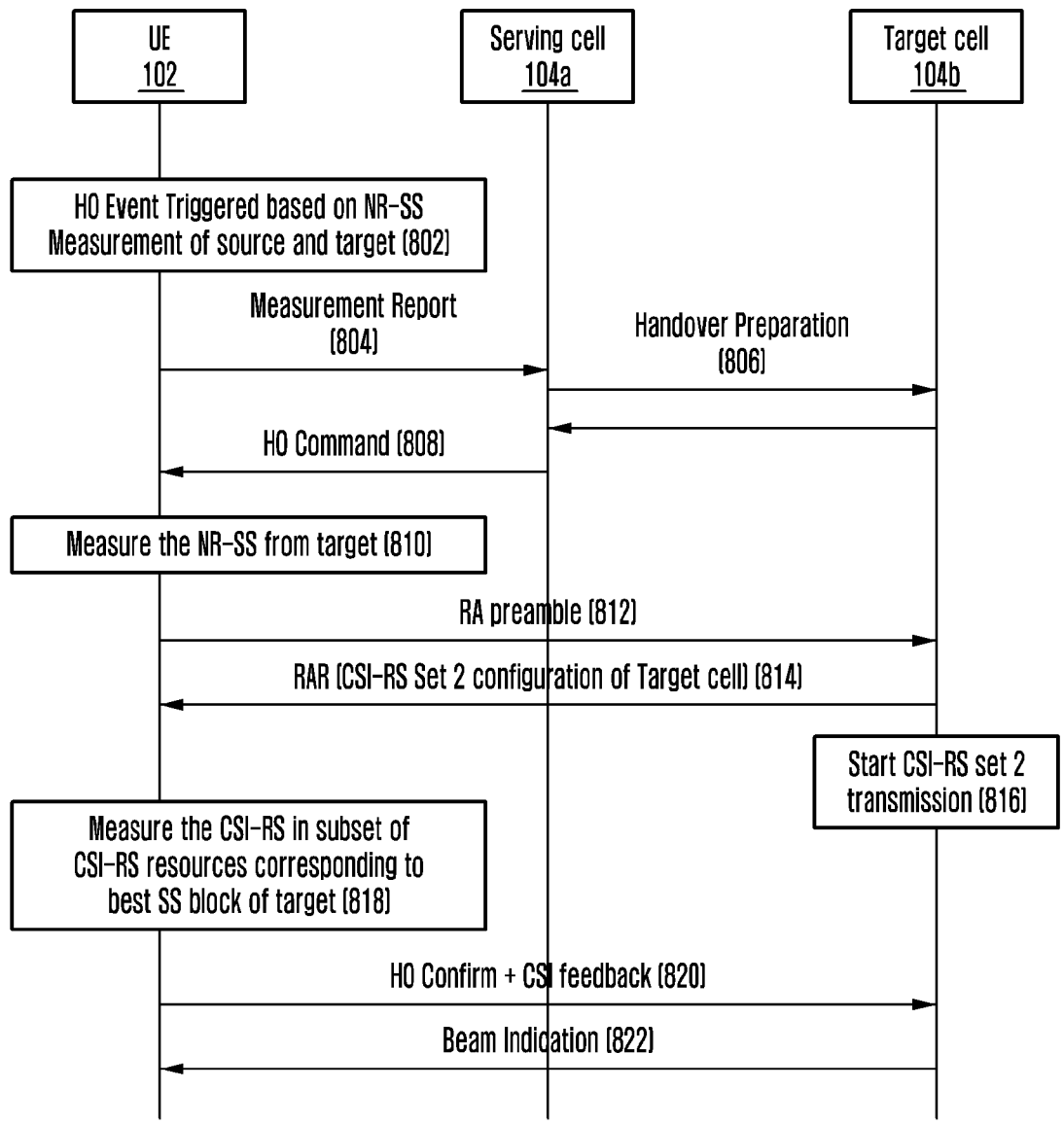
[Fig. 8]

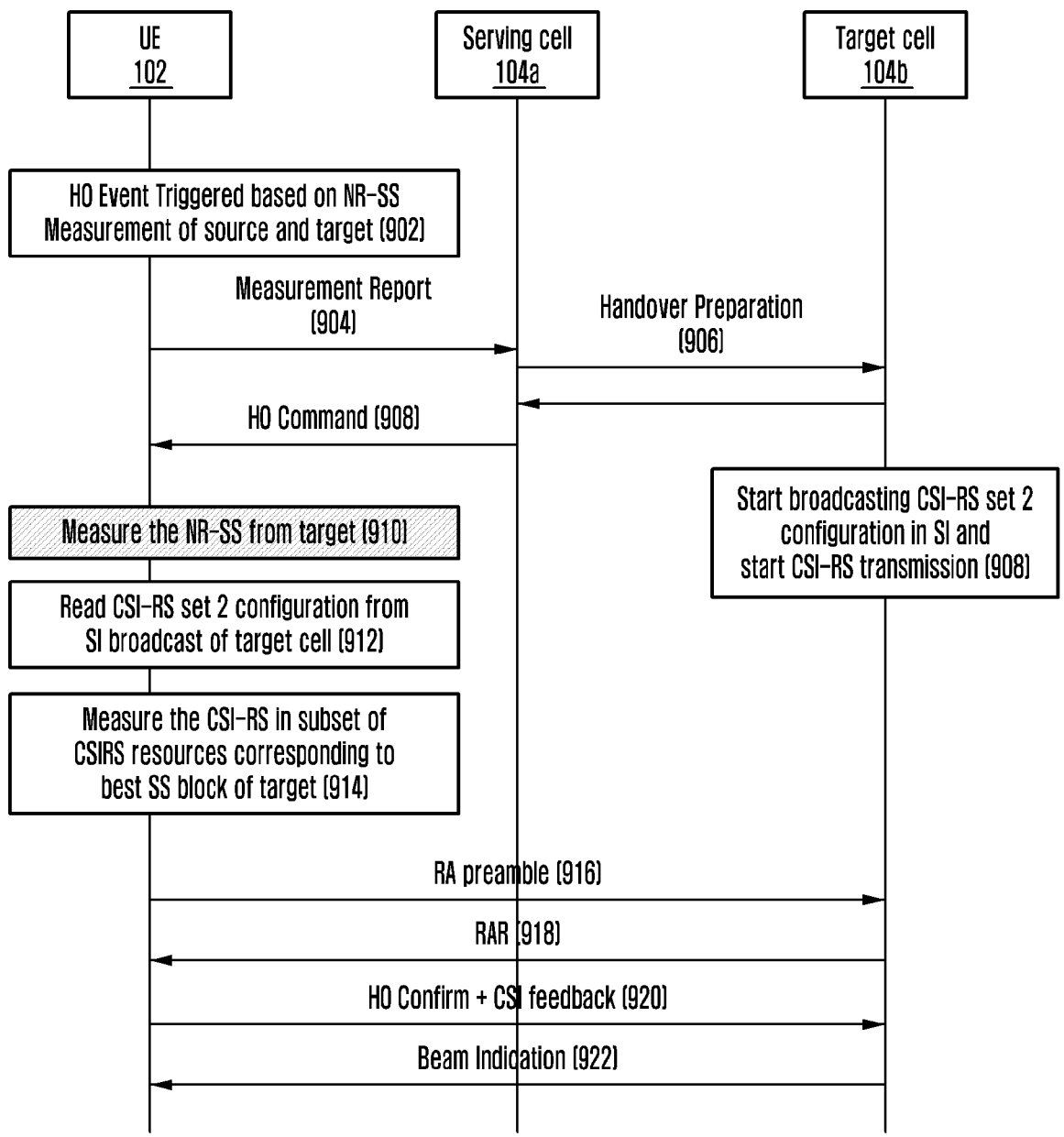
[Fig. 9]

[Fig. 10]
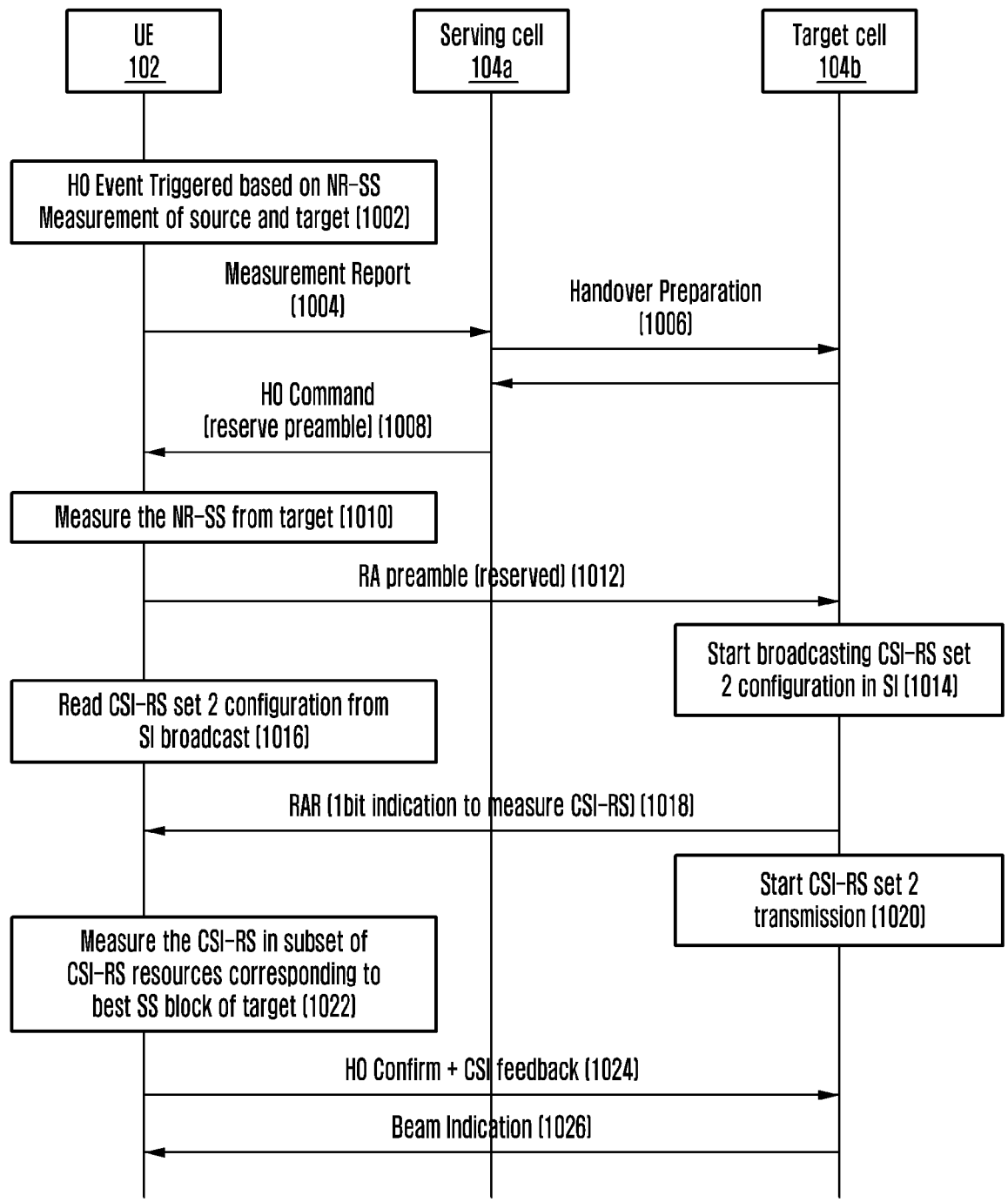

[Fig. 11]
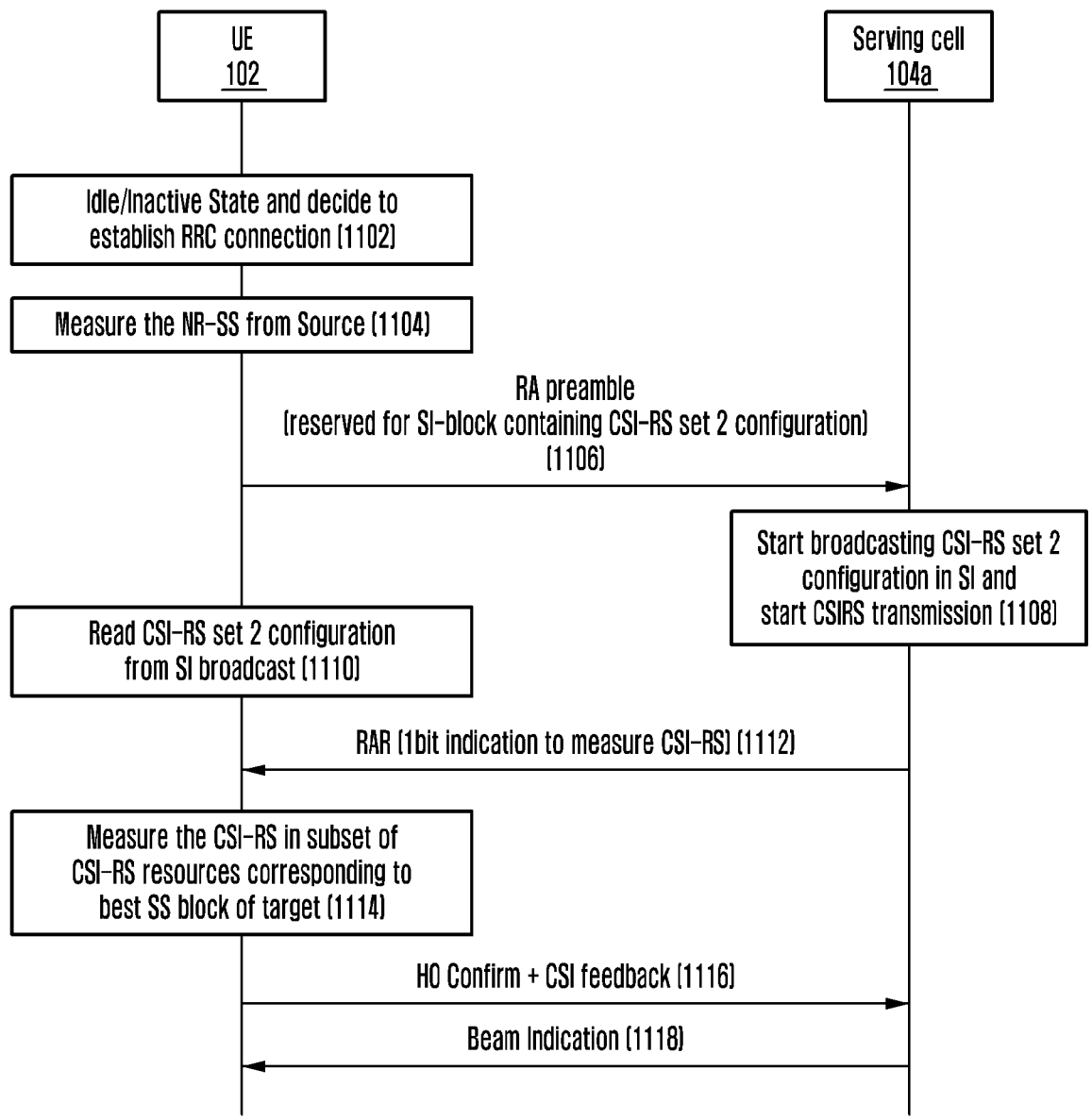

[Fig. 12]
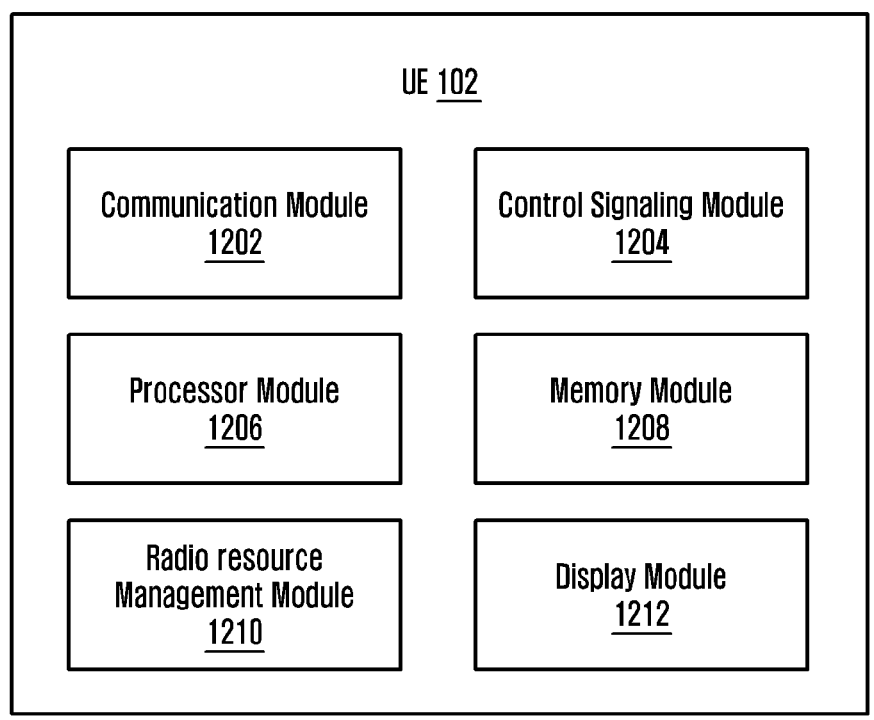

METHOD AND USER EQUIPMENT FOR PERFORMING INITIAL BEAM ALIGNMENT DURING RANDOM ACCESS (RACH) PROCEDURE

CROSS-REFERENCE TO RELATED APPLICATIONS

This application is a 371 of International Application No. PCT/KR2018/003382 filed on Mar. 22, 2018, which claims priority to India Patent Application No. 201741010064 filed on Mar. 22, 2017 and India Patent Application No. 201741010064 filed on Mar. 21, 2018, the disclosures of which are herein incorporated by reference in their entirety.

BACKGROUND

1. Field

The present invention relates to a wireless communication system, and more particularly related to a method and User Equipment (UE) for performing initial beam alignment during random access (RACH) procedure.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. Further fourth generation wireless communication system does not have native support to support emerging applications and services (e.g. Industrial automation) which require very low latency and very high reliability of the transmission. So fifth generation wireless communication system is being developed to meet the growing demand for high speed data services, support ultra-reliability and low latency applications.

The fifth generation wireless communication system will be deployed not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fourth generation wireless communication system, enhanced node B (eNB) or base station serves on or more cells on the same frequency or different frequencies. During mobility when the UE moves from one cell to another either served by the same eNB or different eNB, the UE reports the signal strength measured on reference signals (e.g. Cell-specific reference signals i.e. CRS in LTE) of the cells detected by the UE. The serving cell on which the UE is currently served is called source cell whose signal strength becomes weak at the UE moves towards the border or cell edge of the source cell. The one or more neighbour cell(s) for which the UE has reported signal strength measurements i.e. CRS measurements is called potential target cell. The signal strength of one or more potential target cells becomes better than the serving cell when the UE moves towards the target cell and hence there is need to switch the radio link serving the UE from the source cell to the target cell for service continuity. The serving eNB based on the CRS measurements reported by the UE for the potential target cell prepares the target eNB so that resources are made available in the target eNB when the radio link is switched. This procedure for handling mobility where the radio link is switched from the serving cell to the target cell and the target cell becomes the new serving cell for the UE is called Handover procedure.

The above information is presented as background information only to help the reader to understand the present invention. Applicants have made no determination and make no assertion as to whether any of the above might be applicable as prior art with regard to the present application.

A method of performing initial beam alignment during a random access (RACH) procedure by a User Equipment (UE) is needed.

SUMMARY

Accordingly the embodiments herein provide a method of performing initial beam alignment during a random access (RACH) procedure by a User Equipment (UE). The method includes transmitting a measurement report associated with a target cell to a serving cell in response to a handover event triggered at the UE. The method includes receiving a handover command comprising at least Channel State Information Reference Signal (CSI-RS) configuration of the target cell through the serving cell. Further, the method includes performing downlink (DL) synchronization with the target cell on Synchronization signal (SS) blocks. Furthermore, the method includes indicating a best CSI-RS resource identifier to the target cell by measuring a subset of CSI-RS resources received in the handover command.

In an embodiment, the measurement report includes at least one of: measurements of best SS blocks, corresponding SS block identifier(s) associated with the target cell and measurements of best CSI-RS resources, corresponding CSI-RS resource identifier(s) associated with the target cell, wherein the reported measurements and associated identifiers are above a pre-configured threshold.

In an embodiment, indicating the best CSI-RS resource identifier to the target cell by measuring a subset of CSI-RS resources received in the handover command during the RACH procedure includes identifying a subset of best SS blocks from measurement on SS blocks associated with the target cell while performing DL synchronization. The method includes determining a subset of CSI-RS resources among the CSI-RS resources received in the handover command based on the identified subset of best SS blocks. The method includes measuring the determined subset of CSI-RS resources to identify a best CSI-RS resource identifier. Further, the method includes indicating the best CSI-RS resource identifier to the target cell.

In an embodiment, measuring the determined subset of CSI-RS resources to identify a best CSI-RS resource identifier includes one of: receiving an indication referred as CSI request bit and a CSI-RS configuration in response to preamble transmission on the target cell, wherein if the CSI request bit is enabled or if the CSI-RS configuration is present, the UE performs measurement on the determined subset of CSI-RS resources to identify at least one best CSI-RS resource identifier and reports one or more best CSI-RS measurements and the associated CSI-RS resource identifier(s).

In an embodiment, the best CSI-RS resource identifier to the target cell is indicated in MSG 3 of RACH procedure.

In an embodiment, the one or more best CSI-RS measurements and the associated CSI-RS resource identifier(s) is reported in corresponding PUSCH transmission to the target cell after completion of RACH procedure Accordingly the embodiments herein provide a User Equipment (UE) for performing initial beam alignment during a random access (RACH) procedure. The UE is configured to transmit a measurement report associated with a target cell to a serving cell in response to a handover event triggered at the UE. The UE is configured to receive a handover command comprising at least Channel State Information Reference Signal (CSI-RS) configuration of the target cell via the serving cell. Further, the UE is configured to perform downlink (DL) synchronization with the target cell on Synchronization signal (SS) blocks. Furthermore, the UE is configured to indicate a best CSI-RS resource identifier to the target cell by measuring a subset of CSI-RS resources received in the handover command.

Further, the embodiments herein provide a method and system in which the mmWave/cmWave band is considered common scenario for deployment of 5G or New Radio (NR) system and hence the procedures are described taking the radio characteristics in those bands. However, in practical deployments it is possible to apply the air-interface of NR and beamforming techniques even below 6 GHz band, therefore the applicability of the next generation RAT and the procedures disclosed in the present disclosure should not be considered strictly limited to mmWave/cmWave bands. Since the radio characteristics is different for frequencies in the mmWave/cmWave bands compared to frequencies in sub 6 GHz bands, it is also expected NR system would have native support for beamforming techniques for both broadcast and unicast transmissions towards UE to overcome short propagation distances of radio signals at mmWave/cmWave frequencies.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to provide a method of performing initial beam alignment during a random access (RACH) procedure by a User Equipment (UE).

Another object of the embodiments herein is to provide a method for transmitting a measurement report associated with a target cell to a serving cell in response to a handover event triggered at the UE.

Another object of the embodiments herein is to provide a method for receiving a handover command comprising at least Channel State Information Reference Signal (CSI-RS) configuration of the target cell through the serving cell.

Another object of the embodiments herein is to provide a method for performing downlink (DL) synchronization with the target cell on the Synchronization signal (SS) blocks.

Another object of the embodiments herein is to provide a method for indicating a best CSI-RS resource identifier to the target cell by measuring a subset of CSI-RS resources received in the handover command.

Another object of the embodiments herein is to measure a subset of CSI-RS resources received in the handover command during the RACH procedure.

Another object of the embodiments herein is to identify a subset of best SS blocks from measurement on SS blocks associated with the target cell while performing DL synchronization.

Another object of the embodiments herein is to determine a subset of CSI-RS resources among the CSI-RS resources received in the handover command based on the identified subset of best SS blocks.

Another object of the embodiments herein is to measure the determined subset of CSI-RS resources to identify a best CSI-RS resource identifier.

Another object of the embodiments herein is to report one or more best CSI-RS measurements and the associated CSI-RS resource identifier(s) in corresponding PUSCH transmission to the target cell after completion of RACH procedure.

Another object of the embodiments herein is to provide a method and system to handle the initial beam alignment during RRC connection establishment so that Gbps data rate available on the NR physical layer can be achieved by the UE immediately after completing the RACH procedure for RRC connection establishment.

Another object of the embodiments herein is to provide a method of Handover (HO) based on CSI-RS set 2 configuration.

Another object of the embodiments herein is to provide a method of Handover (HO) based on a conditional trigger.

Another object of the embodiments herein is to provide a method of CSI-RS set 2 configuration in Handover (HO) command.

Another object of the embodiments herein is to provide a method of CSI-RS set 2 activation in Random Access Response (RAR) message.

Another object of the embodiments herein is to provide a method for indicating a Subset in RAR from the configured CSI-RS set 2.

Another object of the embodiments herein is to provide a method of CSI-RS set 2 configuration in RAR.

Another object of the embodiments herein is to provide a method of CSI-RS set 2 configuration in System Information.

Another object of the embodiments herein is to provide a method of CSI-RS set 2 activation with preamble transmission.

Another object of the embodiments herein is to provide a method of CSI-RS set 2 configuration during Connection Establishment.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 1 is an example illustration of Radio Access Network (RAN) deployment of next generation wireless system, according to an embodiment as disclosed herein;

FIG. 2A shows two levels of cell mobility scenario for the UE operating in a beam formed 5G system, according to embodiments as disclosed herein;

FIG. 2B is a flow chart illustrating a method for performing initial beam alignment during a random access (RACH) procedure, by a User Equipment (UE), according to embodiments as disclosed herein;

FIG. 2C is a flow chart illustrating a method for indicating the best CSI-RS resource identifier to a target cell, according to embodiments as disclosed herein;

FIG. 3 is a sequence diagram depicting HO procedure in New Radio (NR) system, according to embodiments as disclosed herein;

FIG. 4 is another sequence diagram depicting HO procedure in NR system based on conditional trigger, according to embodiments as disclosed herein;

FIG. 5 is a sequence diagram depicting the procedure messages for Initial beam alignment based on CSI-RS, according to embodiments as disclosed herein;

FIG. 6 is another sequence diagram depicting the procedure for initial beam alignment based on CSI-RS, according to embodiments as disclosed herein;

FIG. 7 is yet another sequence diagram depicting the procedure for initial beam alignment based on CSI-RS, according to embodiments as disclosed herein;

FIG. 8 is another sequence diagram depicting initial beam alignment procedure based on CSI-RS configuration in Random Access Response (RAR), according to embodiments as disclosed herein;

FIG. 9 is another sequence diagram depicting a procedure for initial beam alignment based on CSI-RS configuration in System Information, according to embodiments as disclosed herein;

FIG. 10 is another sequence diagram depicting a procedure for initial beam alignment procedure based on CSI-RS configuration in System Information, according to embodiments as disclosed herein;

FIG. 11 is another sequence diagram depicting a procedure for initial beam alignment during connection setup/establishment, according to embodiments as disclosed herein; and FIG. 12 is a block diagram illustrating various modules of the UE, according to an embodiment as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method of performing initial beam alignment during a random access (RACH) procedure by a User Equipment (UE). The method includes transmitting a measurement report associated with a target cell to a serving cell in response to a handover event triggered at the UE. The method includes receiving a handover command comprising at least Channel State Information Reference Signal (CSI-RS) configuration of the target cell through the serving cell. Further, the method includes performing downlink (DL) synchronization with the target cell on the Synchronization signal (SS) blocks. Furthermore, the method includes indicating a best CSI-RS resource identifier to the target cell by measuring a subset of CSI-RS resources received in the handover command.

The embodiments herein to achieve the initial beam alignment during RACH procedure are explained based on the CSI-RS set 2 which are cell-specific RS. This should not be considered as the limiting case for the applicability of the invention. In practice the CSI-RS set 1 and CSI-RS set 2 can be a single set in which case the different methods disclosed in the invention are applicable for a single CSI-RS set. Throughout the description, the terms source cell and serving cell are used interchangeably.

The embodiments herein to achieve the initial beam alignment during RACH procedure are explained based on the contention based random access procedure. This should not be considered as the limiting case for the applicability of the invention. In practice the RACH procedure can also be contention free in which case the different methods disclosed in the invention are applicable to both the contention free as well as contention based random access (RACH) procedure.

FIG. 1 is an example illustration of Radio Access Network (RAN) deployment of next generation wireless system, according to an embodiment as disclosed herein. The FIG. 1 depicts the RAN level network architecture consisting of plurality of 5G NodeBs (gNBs) or Central Units (CUs) so on and so forth serving plurality of coverage areas or cells or Transmission Reception Point (TRP) groups or Distributed Unit (DU) groups of the NR system. A data Gateway (GW) can be connected to 1 . . . r 5G nodes of NR i.e., gNBs/CUs for handling the frequency carrier(s) in the coverage area. One gNB/CU of NR may be connected to more than one GW. Within the coverage of gNB1/CU1 and gNB2/CU2 plurality of UE's so on and so forth, which support next generation RAT functionalities (i.e. 5G or NR functionalities) are served in one or more cell(s). The 5G or NR system hierarchy would consist of 1 . . . k CU/gNB nodes such that each gNB/CU node serves 1 . . . m coverage area or Cell(s) or DU groups. Further, one 5G Cell or coverage area or DU consists of 1 . . . n i.e. TRP group so on and so forth; where the front haul between gNB/CU node and DUs/TRP group can be ideal or non-ideal. The TRPs/DUs of one 5G cell or coverage area controlled by 5G CU/gNB, operate to provide 1 . . . p "DL coverage beams". Further, it seems reasonable to assume all TRPs/DUs belonging to the same cell or coverage area are "time synchronized" i.e. same radio frame and System Frame Number (SFN) timing. However in some implementation TRPs/DUs may not be time synchronized. The radio frame duration of NR system is assumed to be 10 ms and the SFN range is 0-1023. In some implementation hyper-SFN i.e. H-SFN is possible and hence the SFN range is for illustration purpose. The maximum number of DL coverage beams 'p' will typically depend on the network implementation and the operating frequency band; i.e. can be larger in higher frequency bands due to smaller antenna separation at the TRPs/DUs of 5G CU/gNB where a large antenna array is practically feasible. The cell of the next generation wireless system is identified by a "Physical Cell Identifier" (PCI) based on the DL NR synchronization signal (NR-SS) broadcasted in the cell. There may also be coverage area-Id or TRP group ID or DU group ID encoded in the NR-SS. The UE can obtain the PCI/coverage area-Id/TRP group Id/DU group ID from the NR-SS transmitted by the 5G Cell of the next generation RAT. It is assumed the TRPs operate together to provide beams to the UE and the notion of individual TRPs is transparent to the UE. Therefore, at least the PCI is detected by the UE over the radio of NR. The UE shall detect and decode the NR Synchronization Signal (NR-SS) and physical broadcast channel (PBCH) to determine the PCI and the global Cell Identity respectively. The global Cell Identity is unique identity for the cell within the operator network (PLMN) whereas the PCI has limited range and repeated in non-overlapping coverage area of operator network. The TRP group or DU operate together to provide two sets of beams i.e. 1) Coverage Beams and 2) Dedicated Beams. There may be explicit Beam Index Sequence to determine a "Beam Identifier" (Beam-Id) or the Beam-Id may be implicitly encoded on the radio (e.g. like a time index).

The coverage beams are wide beams transmitted by the TRP group or DU under the control of 5G CU/gNB. The coverage beams provide the cell coverage with a fixed set of directed coverage beams, also called as "grid of beams". Coverage beams cover a relatively wide area and can thus only support relatively low data rates. For example in a cell the NR-SS can be transmitted on the DL coverage beams. In addition to the NR-SS the gNB can transmit cell-specific reference signals called Channel State Information-Reference Signal (CSI-RS) on the DL coverage beams. The CSI-RS are cell-specific reference signals which can be turned ON/OFF depending on the presence of RRC CONNECTED UEs in the cell. In addition to the cell-specific CSI-RS there can be UE-specific CSI-RS which is transmitted using narrow dedicated beams. Hence, there are two sets of CSI-RS i.e. CSI-RS set 1 which is UE-specific and CSI-RS set 2 which is cell-specific. Both the CSI-RS set reference signals are not ALWAYS ON signals like the NR-SS. As an example each DL coverage beam from the respective TRP/DU could cover 30-60 degree sector angle such that grid of coverage beams covers the cell radius circular area. Each coverage beam is identified either by a "Beam-Id" implicitly or explicitly so that UE can identify NR-SS block RSRP or CSI-RS RSRP of set 2. The coverage beams transmit the Synchronization Signal (SS) block and PBCH either in time multiplexed manner or frequency multiplexed manner. The cell-specific reference signals i.e. CSI-RS set 2 may be used for beam signal strength measurements for a procedure called "Initial beam alignment". Further it may be possible to combine the beam quality of CSI-RS set 2 to derive cell quality and hence can be used for HO procedure or so called RRC drive L3 mobility. These reference signals are generically referred as Channel-State Information-Reference Signal (CSI-RS set 2) and can be used for Radio Resource Management (RRM) measurements for cell level mobility. The characteristics i.e. beam width; beam gain etc. of the DL coverage beams that transmit NR-SS/PBCH and the DL coverage beams that transmit CSI-RS set 2 may be same or different depending on network implementation. Further, coverage beams can also be used for transmitting DL common channel signaling e.g. RACH response. Coverage beams can carry control channel transmissions like enhanced Physical Downlink Control Channel (ePDCCH) and user data Physical Downlink Shared Channel (PDSCH) can also be transmitted on coverage beams when dedicated beams to the UE have been lost.

Dedicated transmissions towards the UE (ePDCCH/PDSCH) may potentially use even more directed and sharp beams (e.g. UE specific pre-coding) on so called "Dedicated Beams". Coverage area of dedicated beams would be much smaller in terms of beam width compared to coverage beams (e.g. ½, ¼ or ⅛th of coverage beam area). Dedicated beams are managed based on UE measurement on UE-specific Channel-State Information-Reference Signal (CSI-RS set 1) and UE provides CSI feedback at PHY or MAC layer. This is referred as beam switching or beam management which can occur across the beams of the serving DU/TRP group controlling the cell. Beam switching or beam management within the same cell is managed at PHY or MAC layer based on CSI feedback from UE derived from UE-specific CSI-RS set 1. The CSI feedback is sent on uplink control channel like PUCCH or can also sent on shared data channel like PUSCH. To demodulate ePDCCH/PDSCH carried on dedicated beams, Demodulation reference signals (DMRS) is also transmitted on dedicated beam. Since UE just see DMRS kind of reference signals coming from the cell of the NR system the notion of coverage beam and dedicated beam is transparent to the UE from PDSCH reception point of view. However, notion of coverage beam is known to UE for reception of NR-SS. Therefore, when TRPs/DU of 5G gNB/CU detects UE has lost dedicated beams based on CSI-RS set 1 measurement feedback and UE is scheduled data on coverage beam then UE will not be aware that the transmission is coming from a coverage beam. To the UE this looks like any other transmission coming from a dedicated beam. Cell edge bitrates on coverage beams will be much lower than cell edge bitrates achievable by dedicated beams.

The beam switching within the same cell does not have any impact on the user plane functions/layers. For beam switching or beam management across the beams of different DU/TRP group of another cell from the serving DU/TRP group the UE first needs to undergo HO procedure. During the HO procedure, there is need for initial beam alignment in the target cell served by the different DU/TRP group than the DU/TRP group serving the source cell. If the initial beam alignment is not performed at the earliest i.e., upon completion of RACH in the target cell then there is possibility of data rate degradation. When the UE was served by the source cell dedicated beams were used for data scheduling with very high data rate e.g. few Gbps data rate and when HO procedure is triggered to target cell, it is desirable that the UE is served by the dedicated beams of the target cell at the earliest to maintain the Gbps data rate. Otherwise upon HO to target cell the UE may be served by coverage beams of target cell but with temporary degradation of data rate which is restored after receiving feedback for the CSI-RS set 1. Such temporary degradation of Gbps data rate have impacts to the TCP performance which ramps up after the slow start. Therefore, there is need to handle the mobility such that initial beam alignment is performed at the earliest during HO procedure so that Gbps data rate degradation is avoided. The RACH in the target cell during HO procedure can be either contention free or contention based random access. In another scenario, when the UE transition from idle state to connected state (i.e. during RRC connection establishment) it is desirable that UE is scheduled on the dedicated beams at the earliest so that the slow start of TCP mechanism is completed as soon as possible. Therefore there is need to handle the initial beam alignment during RRC connection establishment so that Gbps data rate available on the NR physical layer can be achieved by the UE immediately after completing the RACH procedure for RRC connection establishment.

Referring now to the drawings, and more particularly to FIGS. 2 through 12, where similar reference characters denote corresponding features consistently throughout the figures, there are shown preferred embodiments.

FIG. 2A shows two levels of cell mobility scenario for a User Equipment operating in a beam formed 5G system, according to embodiments as disclosed herein. The UE 102 is configured to operate in beamforming mode is served by Cell #1 from gNB #1 of 5G or NR system. The first level of UE 102 mobility involves change of primary cell (PCell) where the UE 102 is handed over from PCell #1 of gNB #1 to PCell #2 of gNB #2. The PCell mobility can be understood as coverage layer mobility handled by handover procedures involving triggering of measurement events based on handover events similar to the Event A1, Event A2, Event A3, Event A4 and so on as specified in TS 36.331. At the border or cell edge which is overlapping area of PCell #1 (i.e. source cell) and PCell #2 (i.e. potential target cell) the measurement event configured for UE 102 is triggered in order to support such coverage layer mobility. Such measurement events are based on signal strength measurements (e.g. RSRP/RSRQ) performed by UE 102 on the synchronization signals (NR-SS) and/or RSRP/RSRQ measurements on cell-specific reference signals like the CSI-RS (referred as CSI-RS set 2) transmitted by PCell #1 and PCell #2.

In an embodiment, the measurement event configured for UE 102 for handling of PCell mobility of NR is based on RSRP/RSRQ measurements performed by UE on NR-SS and/or cell-specific reference signals like the CSI-RS (CSI-RS set 2) transmitted by PCell #1, PCell #2, PCell #3, etc. on the DL coverage beams respectively. There is need to define the measurement metric based on NR-SS and/or CSI-RS set 2 which take into account the cell quality of the cells of NR systems used for comparing the relative or absolute signal strength.

Depending on NR-SS and/or CSI-RS set 2 based measurement reports sent by the UE 102 (e.g. through RRC signalling) to gNB #1 on PCell #1 at least the following events are possible: a) PCell #2 preparation procedure is executed to prepare PCell #2 of gNB #2, b) after response from gNB #2 PCell change procedure is triggered based on the HO command prepared by the target gNB #2. The current serving cell of UE i.e., PCell #1 of gNB #1 is changed to PCell #2 of gNB #2 based on the NR-SS and/or CSI-RS set 2 measurements of PCell #1 and PCell #2.

On receiving RRC reconfiguration message containing the HO command which basically includes the PCell #2 configuration the UE 102 would initiate the RACH procedure towards PCell #2 to re-establish the user plane protocol stack including at least the MAC, RLC and PDCP entity. In such an event the UE 102 re-establish the data radio bearers on PCell #2 to continue DL/UL data transfer on PCell #2 for service continuity. The RACH procedure may be contention free or contention based. During the first level of mobility i.e. HO procedure driven by RRC there is also a need to handle the second level of UE mobility which is called as beam level mobility or beam management. The beam management involves two phases i.e. a) first phase called initial beam alignment where the serving DL beam of the UE 102 in the source cell is switched to another serving DL beam in the target cell b) second phase called beam refinement where the serving DL beam of the UE 102 in the new source cell (i.e. target cell) is switched to another serving DL beam in the new source cell. There are several methods to handle the first phase (i.e. initial beam alignment) of beam management. The initial beam alignment can be handled at the physical (PHY) layer or MAC layer or RRC layer depending on the selected method. Such initial beam alignment can based on the measurement feedback on NR-SS and/or CSI-RS set 2. The beam level measurement configuration i.e. CSI-RS set 2 configurations can be provided to the UE in the system information and/or during PCell change procedure i.e. HO command. In an embodiment, the beam mobility measurement configuration i.e. CSI-RS set 2 configurations includes at least the CSI-RS resources or CSI-RS processes, the PCI of the cell transmitting the CSI-RS set 2, the beam index or resource identifier i.e. mapping of beam index or resource identifier to the CSI-RS resources etc. The UE should monitor the CSI-RS set 2 to perform CSI measurements that includes at least CSI-RS RSRP measurements on the CSI-RS set 2 resources configured for the UE 102. These CSI set 2 measurements are reported by the UE 102 either in measurement report triggered at RRC level or at MAC/PHY layer directly to the concerned PCell so that concerned PCell performs the initial beam alignment decisions. The CSI-RS measurements associated with target cell performed by the UE can be reported as one of Channel Quality Indicator (CQI), Rank Indicator (RI), Pre-coding matrix indicator (PMI) and associated resource identifier.

FIG. 2B is a flow chart 200b illustrating a method for performing initial beam alignment during a random access (RACH) procedure, by a User Equipment (UE), according to embodiments as disclosed herein.

At step 202b, the method includes transmitting a measurement report associated with the target cell 104b to the serving cell 104a in response to the handover event triggered at the UE 102. The UE 102 is configured to transmit the measurement report associated with the target cell 104b to the serving cell 104a in response to the handover event triggered at the UE 102.

In an embodiment, the measurement report includes at least one of: measurements of best SS blocks, corresponding SS block identifier(s) associated with the target cell and measurements of best CSI-RS resources i.e. CSI-RS RSRP or CSI-RSRQ, corresponding CSI-RS resource identifier(s) associated with the target cell. The reported measurements and associated identifiers are above a pre-configured threshold.

At step 204b, the method includes receiving a handover command including at least CSI-RS configuration of the target cell 104b through the serving cell 104a. The UE 102 is configured to receive the handover command including at least CSI-RS configuration of the target cell 104b through the serving cell 104a. The CSI-RS configuration includes at least the cell-specific signal time windows (period, offset, duration), referred to as CSI-RS Measurement Timing Configuration, a list of configurations that includes CSI-RS resource identity, PCI, scrambling Identity, resource configuration including non-zero power (NZP) resources, zero power (ZP) resources and interference measurement (IM) resources, subframe offset as well as a Qoffset.

At step 206b, the method includes performing downlink (DL) synchronization with the target cell on the SS blocks. The UE 102 is configured to perform DL synchronization with the target cell 104b on the SS blocks.

At step 208b, the method includes indicating the best CSI-RS resource identifier to the target cell by measuring a subset of CSI-RS resources received in the handover command. The UE 102 is configured to indicate the best CSI-RS resource identifier to the target cell by measuring a subset of CSI-RS resources received in the handover command. In an embodiment, at least the best CSI-RS resource identifier and CQI, PMI, RI to the target cell is indicated in MSG 3 of RACH procedure. In an alternate embodiment, the best/suitable CSI-RS resource identifier is indicated in MSG1 wherein UE transmit MSG1 (PRACH preamble) using the dedicated preamble and/or resources corresponding to CSI-RS resource identifier.

The best NR-SS and associated beam index or the best CSI-RS resource and associated resource identifier represent the qualified measurement or suitable measurement which is above a pre-configured threshold, wherein the threshold can be either relative threshold or absolute threshold.

The various actions, acts, blocks, steps, or the like in the flow chart 200b may be performed in the order presented, in a different order or simultaneously. Further, in some embodiments, some of the actions, acts, blocks, steps, or the like may be omitted, added, modified, skipped, or the like without departing from the scope of the invention.

FIG. 2C is a flow chart 200c illustrating a method for indicating the best CSI-RS resource identifier to the target cell, according to embodiments as disclosed herein.

At step 202c, the method includes identifying a subset of best SS blocks from measurement on SS blocks associated with the target cell while performing DL synchronization. The UE 102 is configured to identifying a subset of best SS blocks from measurement on SS blocks associated with the target cell while performing DL synchronization.

At step 204c, the method includes determining the subset of CSI-RS resources among the CSI-RS resources received in the handover command based on the identified subset of best SS blocks. The UE 102 is configured to determine the subset of CSI-RS resources among the CSI-RS resources received in the handover command based on the identified subset of best SS blocks.

At step 206c, the method includes measuring the determined subset of CSI-RS resources to identify a best CSI-RS resource identifier. The UE 102 is configured to measure the determined subset of CSI-RS resources to identify a best CSI-RS resource identifier.

In an embodiment, the UE is configured to measure the determined subset of CSI-RS resources by receiving an indication referred as CSI request bit, in response to preamble transmission on the target cell 104b. If the CSI request bit is enabled, then the UE 102 performs measurement on the determined subset of CSI-RS resources to identify at least one best CSI-RS resource identifier and report the corresponding CQI, PMI, RI. The UE may report one or more best CSI-RS measurements and the associated CSI-RS resource identifier(s).

At step 208c, the method includes indicating the best CSI-RS resource identifier and corresponding CQI, PMI, RI to the target cell. The UE is configured to indicate the best CSI-RS resource identifier and corresponding CQI, PMI, RI to the target cell 104b. In an embodiment, best CSI-RS resource identifier and corresponding CQI, PMI, RI to the target cell is indicated in MSG 3 of RACH procedure. In an embodiment, best CSI-RS resource identifier and corresponding CQI, PMI, RI to the target cell is transmitted to target cell in the UL grant received in random access response of RACH procedure.

The various actions, acts, blocks, steps, or the like in the flow chart 200c may be performed in the order presented, in a different order or simultaneously. Further, in some embodiments, some of the actions, acts, blocks, steps, or the like may be omitted, added, modified, skipped, or the like without departing from the scope of the invention.

FIG. 3 is a sequence diagram depicting HO procedure in NR system, according to embodiments as disclosed herein. FIG. 3 depicts the configuration of cell-specific reference signal i.e. Channel State Information-Reference Signal (CSI-RS) for radio resource management (RRM) measurements to be performed by the UE 102 for the concerned cells involved in HO i.e. RRC driven L3 mobility. The UE 102 receives (302) the measurement configuration from the serving cell 104a i.e., Cell #1 served by the Serving gNB. The measurement configuration from the serving cell 104a configures the UE 102 to report measurements. The measurement configuration may include a list of measurements, each comprising the following elements: a) Measurement identity which identifies a measurement linking a measurement object to a reporting configuration; b) Measurement object which specifies a carrier frequency of a certain RAT type (e.g. MeasObject #1 for all cells on NR frequency, MeasObject #2 for all cells on a LTE frequency, etc.) so on and so forth, c) Measurement reporting configuration specifies when the UE 102 should trigger a measurement report as well as which information the UE 102 shall include in the measurement report. The trigger for sending measurement report is specified as a particular 'event condition' e.g. a neighbor cell becomes a certain offset better than the current serving cell, namely Event A3. A measurement report may also be triggered at regular intervals i.e. periodically, possibly up to a configurable number of times. The reporting configuration also specifies which measurement quantities should be reported, the maximum number of cells that may be included (in order of measurement result i.e. best cell first). The reporting configuration can be same for the NR-SS measurement reports and the CSI-RS measurement reports. Further for beam quality reporting the reporting configuration includes either only the beam index of the best beam or both the beam index and the corresponding NR-SS block RSRP or CSI-RS RSRP value. The reporting configuration may also configure the UE 102 to report the N best beams where the value of N is either configured in reporting configuration or the N best beams depends on the number of good beams or qualified/suitable beams within X dB offset of the best beam. The qualified/suitable beams can also be determined if the signal strength of the beam is above an absolute threshold i.e. greater than or equal Y dBm. Since the NR-SS signals are ALWAYS ON signals which are self-discoverable by the UE 102, these NR-SS signals can be transmitted as NR-SS bursts comprising NR-SS blocks. The NR-SS block includes at least the primary synchronization signal (PSS), the secondary synchronization signal (SSS) and primary broadcast channel. The beam index sequence or SS block ID may also be transmitted in SS block. The NR-SS bursts can be transmitted over DL coverage beams such that set of NR-SS burst are repeated in the NR-SS burst period. After decoding the NR-SS the UE 102 can measure the NR-SS block signal strength i.e. NR-SS block RSRP which may correspond to the beam quality of DL coverage beam on which the NR-SS block is transmitted. During the NR-SS burst periodicity, the UE 102 may detect one or more NR-SS blocks i.e. one or more beam quality which can be consolidated to derive the cell quality based on some methods like averaging the detected beam quality or some other methods like weighted averaging of the detected beam quality. Based on the configured events, if the event for reporting the cell quality of the source cell 104a and the target cell 104b is triggered (304), the UE 102 transmits (306) the measurement report #1 (i.e., the UE 102 reports NR-SS RSRP and/or RSRQ of the source cell 104a and the target cell 104b. The measurement report includes at least one of: measurements of best SS blocks and corresponding SS block identifier(s) i.e. beam indexes associated with the target cell. The reported NR-SS beam measurements and associated identifiers are above a pre-configured threshold which can be either a relative or absolute threshold. Based on the measurement report #1, the serving cell 104a initiates (308) the procedure towards target cell 104b to activate the CSI-RS set 2 transmissions.

Since the CSI-RS set 2 signals are not ALWAYS ON signals like the NR-SS, it can be turned ON and OFF based on certain triggers. The target cell 104b considers the activation message from serving cell 104a as trigger to activate the CSI-RS set 2 transmissions in the target cell 104b i.e. Cell #2 indicated in the activation message. The target cell 104b also provides (310) the serving cell 104a, the CSI-RS set 2 configuration which includes at least the cell-specific signal time windows (period, offset, duration), referred to as CSI-RS Measurement Timing Configuration, and a list of CSI-RS configurations that includes CSI-RS resource identity, PCI, scrambling Identity, resource configuration including non-zero power (NZP) resources, zero power (ZP) resources and interference measurement (IM) resources, subframe offset as well as a Qoffset. The serving cell 104a (i.e. Cell #1) in addition to the CSI-RS set 2 configuration of target cell 104b (i.e. Cell #2) also includes its own CSI-RS set 2 configuration in a RRC message sent (312) to the UE 102. The serving cell 104a (i.e. Cell #1) and target cell 104b (i.e. Cell #2) start (314) transmitting the respective cell-specific CSI-RS set 2 in order to enable the UE to measure the corresponding signal strength on CSI-RS resources for mobility (i.e. PCell change) decision evaluation. Assuming that Cell #1 and Cell #2 are on same frequency, the UE 102 starts (316) measuring the CSI-RS set 2 of the involved cells according to the received configuration in RRC message. The procedure remains same if the Cell #1 and Cell #2 are on different frequencies. Similar to the NR-SS the CSI-RS set 2 is transmitted on plurality of DL coverage beams albeit, the characteristics of the DL coverage beams for NR-SS and CSI-RS set 2 may or may not be same. However, the UE 102 derives the cell quality for the source cell and the target cell based on the beam quality of CSI-RS set 2 in similar way as the cell quality based on NR-SS. The event for the NR-SS based report trigger and the event for the CSI-RS set 2 based report trigger are independent events. The UE 102 sends (318) the measurement report #2 which includes the cell quality based on CSI-RS set 2 (i.e. CSI-RS RSRP) for the involved cells and also includes the best beam quality of the CSI-RS set 2 i.e. the CSI feedback of the target cell. The measurement report includes at least one of: measurements of best CSI-RS resources and corresponding resource identifier(s) i.e. beam indexes associated with the target cell. The reported CSI-RS beam measurements and associated identifiers are qualified or suitable measurements which are above a pre-configured threshold which can be either a relative or absolute threshold. On receiving the measurement report #2, the serving cell 104a initiates (320) the HO preparation procedure towards the target cell 104b so that radio resources are made available in the target cell 104b i.e. Cell #2 when the UE 102 radio link is switched to Cell #2. During the HO preparation procedure the serving cell 104a forwards the UE 102 provided CSI feedback which corresponds to the best beam of the target cell. The CSI feedback may include the CQI, PMI, RI and the associated resource identifier. Such information may be useful in the target cell after the RACH procedure in the target cell to start scheduling data transmission with the UE 102 reported best beam. In the procedure depicted in FIG. 3, the HO is based on MR containing RSRP of NR-SS of involved cells (i.e. Measurement Report #1) and also CSI-RS RSRP of involved cells (i.e. Measurement Report #2). Further identification of best beam of target cell 104b for initial beam alignment is based on CSI-RS set 2 of target cell 104b reported in MR #2. Therefore the FIG. 3 procedure for both L3 mobility and initial beam alignment is based on cell-specific CSI-RS.

The Measurement Report includes best CSI-RS resource identifier i.e., best beam of target cell 104b, then it may be possible that the reported best beam will not remain the best beam when UE 102 completes RACH with the target cell 104b. The RACH procedure on the target cell 104b can be either contention free or contention based. There is considerable delay after sending Measurement Report #2 i.e., the serving cell 104a has to prepare target cell 104b on X2 like interface, then forwards (322) the HO command to UE 102, after receiving HO command the UE 102 performs (324) DL sync with target cell 104b and performs (326) RACH. Therefore in certain implementation where the delay is high the best beam of target cell 104b reported in Measurement Report may not remain the best beam. Instead the initial beam alignment measurement should start after the UE 102 receives the HO command and when UE 102 performs DL sync with the target cell 104b. During this operation UE 102 can know the CSI-RS set 2 of target cell 104b (e.g. CSI-RS set 2 of target cell 104b can be received from serving cell 104a; or CSI-RS set 2 of target cell 104b can be obtained by the UE 102 from target cell's 104b system information; or CSI-RS set 2 of target cell 104b can also be received (328) from target cell 104b in RAR during the random access procedure) and starts measuring the CSI-RS resource while in parallel UE 102 initiates RACH. If the N best CSI-RS i.e. beam(s) is determined then it should be reported (330) during the RACH procedure i.e. may be in MSG3. In an embodiment, the best/suitable CSI-RS resource identifier can be indicated in MSG1 wherein UE transmit MSG1 (PRACH preamble) using the dedicated preamble and/or resources corresponding to CSI-RS resource identifier. Since this is fresh measurement this would be helpful for initial beam alignment rather than old measurement sent in Measurement Report #2. During the RACH procedure in the target cell 104b it can be possible that the RAR may include a 1 bit indication referred as CSI request bit for the UE 102 to start measuring the CSI-RS resources of target cell or the RAR can indicate (332) the subset of CSI-RS resources from the previous CSI-RS set 2 configuration to be measured by the UE 102.

FIG. 4 is a sequence diagram depicting HO procedure in NR system based on conditional trigger, according to embodiments as disclosed herein. The solution depicted in FIG. 4 is similar to solution in FIG. 3 which assumes that there are independent events for NR-SS based Measurement Report triggering and CSI-RS based Measurement Report (MR) triggering. In FIG. 4, the UE 102 triggers (402) the MR based on event which compares the RSRP of NR-SS of the serving cell 104a and NR-SS of the target cell 104b. In the MR, the UE 102 indicates (404) the PCI of the target cell 104b and corresponding cell quality i.e. NR-SS RSRP. The measurement report includes at least one of: measurements of best SS blocks and corresponding SS block identifier(s) i.e. beam indexes associated with the target cell. The reported NR-SS beam measurements and associated identifiers are qualified or suitable measurements which are above a pre-configured threshold which can be either a relative or absolute threshold. On receiving the MR, the serving cell 104a initiates (406) the HO preparation procedure towards the target gNB so that radio resources are made available in at least one target cell 104b i.e. Cell #2 when the UE 102 radio link is switched to Cell #2.

During the HO preparation procedure the serving cell 104a may forward the UE 102 provided NR-SS RSRP corresponding to the PCI of the target cell 104b handled by the target gNB. The serving cell 104a provides (408) the CSI-RS set 2 configuration of the target cell 104b through UE-specific signalling (i.e. RRC reconfiguration message corresponding to HO command) and there may be a conditioned HO command executed by the UE 102 at later time. The CSI-RS configuration includes at least the cell-specific signal time windows (period, offset, duration), referred to as CSI-RS Measurement Timing Configuration, a list of configurations that includes CSI-RS resource identity, PCI, scrambling Identity, resource configuration including non-zero power (NZP) resources, zero power (ZP) resources and interference measurement (IM) resources, subframe offset as well as a Qoffset. The condition for executing the HO command may be for example based on the CSI-RS event evaluation. The serving cell 104a (i.e. Cell #1) and target cell 104b (i.e. Cell #2) start (410) transmitting the respective cell-specific CSI-RS set 2 in order to enable the UE 102 to measure the corresponding signal strength on CSI-RS resources for mobility (i.e. PCell change) decision evaluation. The UE 102 measures (412) the CSI-RS of the serving cell 104a and CSI-RS of target cell 104b. In FIG. 3 MR #2 is triggered is based on event configured for CSI-RS since there is no conditioned HO command. However in FIG. 4 since the CSI-RS based event trigger is the condition there is no need to send MR #2. The UE 102 autonomously takes the HO decision based on RSRP of CSI-RS of involved cells. The UE 102 executes the earlier received HO command. Further, the UE 102 performs (414) DL sync with the target cell 104b and measures NR-SS of the target cell 104b. Since CSI-RS set 2 configuration of target cell 104b is known, the UE 102 identifies N best beam(s) based on measurement of CSI-RS set 2 of target cells 104b while attempting (416) RACH on the target cell 104b. The RACH procedure towards the target cell 104b can be either contention free or contention based. In MSG3, the UE 102 indicates the N best beam(s) (i.e. CSI feedback) based on N best CSI-RS for initial beam alignment. The CSI feedback may include the CQI, PMI, RI and the associated resource identifier corresponding to target cell 104b.

In an embodiment, during the RACH procedure in the target cell 104b it can be possible that the Random Access Response (RAR) (418) may include a 1 bit indication referred as CSI request bit for the UE 102 to start measuring the CSI-RS resources of target cell 104b. In this case, the UE 102 may measure (420) all CSI-resources in CSI-RS set 2 received in HO command.

Alternately, the UE 102 can measure the subset of resources in CSI-RS set 2 corresponding to best SS block of the target cell 104b. In an alternate embodiment the RAR can indicate the subset of CSI-RS resources to be measured by the UE 102 from the previously configured CSI-RS set 2 configuration in the HO command. In the procedure depicted in FIG. 4, the HO is based on MR containing RSRP of NR-SS of involved cells (i.e. Measurement Report) and also CSI-RS RSRP of involved cells (i.e. conditional HO without Measurement Report #2).

Further identification of N best beam(s) of the target cell 104b for initial beam alignment is based on measurements on CSI-RS set 2 of the target cell 104b reported (422) in MSG3 or in the UL grant received in RAR and the target cell 104b provides (424) beam indication to the UE 102. Therefore the FIG. 4 procedure for both L3 mobility and initial beam alignment is based on cell-specific CSI-RS.

FIG. 5 is a sequence diagram depicting HO based on NR-SS and initial beam alignment based on CSI-RS, according to embodiments as disclosed herein. In the procedure depicted in FIG. 5, the HO is based only on MR containing RSRP of NR-SS of involved cells (i.e. Measurement Report) and CSI-RS RSRP of involved cells is not used for HO decision for the purpose of simplification of the method. This is not a restriction and the HO decision can be based either on signal strength of NR-SS measurement or the signal strength of CSI-RS measurement depending on the network configuration. Further identification of N best beam(s) of the target cell 104b for initial beam alignment is based on measurement on CSI-RS set 2 configuration of the target cell 104b provided in HO command. In an embodiment, the UE 102 may measure all CSI-resources in CSI-RS set 2 received in HO command to identify N best beam(s). In another embodiment, the UE 102 can measure the subset of resources in CSI-RS set 2 corresponding to best SS block of the target cell 104b.

Therefore in the FIG. 5 procedure for the purpose of explanation the L3 mobility is based on NR-SS signal quality i.e. cell quality based on NR-SS RSRP and initial beam alignment is based on cell-specific CSI-RS i.e. beam quality based on CSI-RS RSRP.

The UE triggers (502) handover event based on NR-SS measurement of the serving cell 104a and the target cell 104b. The UE triggers (504) the MR based on the handover event which compares the RSRP of NR-SS of the serving cell 104a and the NR-SS of the target cell 104b. In the MR, the UE 102 indicates the PCI of the target cell 104b and corresponding cell quality i.e. NR-SS RSRP. The measurement report includes at least one of: measurements of best SS blocks and corresponding SS block identifier(s) i.e. beam indexes associated with the target cell. The reported NR-SS beam measurements and associated identifiers are above a pre-configured threshold which can be either a relative or absolute threshold. On receiving the MR, the serving cell 104a initiates (506) the HO preparation procedure towards the target cell 104b so that radio resources are made available in at least one target cell 104b.

After the HO preparation with the target gNB, the serving cell 104a (i.e. Cell #1) forwards (508) to the UE 102 the CSI-RS set 2 configuration of target cell 104b received from the target gNB. The CSI-RS configuration includes at least the cell-specific signal time windows (period, offset, duration), referred to as CSI-RS Measurement Timing Configuration, a list of configurations that includes CSI-RS resource identity, PCI, scrambling Identity, resource configuration including non-zero power (NZP) resources, zero power (ZP) resources and interference measurement (IM) resources, subframe offset as well as a Qoffset. After receiving the HO command, the UE 102 measures (512) the NR-SS of the target cell 104b. The UE 102 measures the NR-SS block RSRP which corresponds to the beam level quality. The UE 102 determines the best beam quality of the NR-SS block. Even though the DL coverage beam characteristics of the NR-SS transmission and CSI-RS set 2 transmissions may or may not be same, the UE 102 can implicitly identify the subset set of CSI-RS resources to be measured (514) from the CSI-RS configuration of the target cell 104b based on the best beam quality corresponding to NR-SS block of the target cell 104b. Further, the UE 102 initiates (516) the RACH and receives (518) RAR message from the target cell 104b. The RACH procedure towards the target cell 104b can be either contention free or contention based. The CSI-RS RSRP of the best CSI-RS resource and associated CSI-RS resource identifier from the subset of resources can be indicated (520) by the UE 102 to the target cell 104b in MSG3 of the RACH procedure or in UL grant received in RAR as CSI feedback along with the HO confirmation. The CSI feedback may include the CQI, PMI, RI and the associated resource identifier corresponding to target cell 104b. Alternately, the CSI feedback may correspond to the N best beam based on CSI-RS resource measurement from subset of set 2 resources. In an alternate embodiment, the best/suitable CSI-RS resource identifier is indicated in MSG1 wherein UE transmit MSG1 (PRACH preamble) using the dedicated preamble and/or resources corresponding to CSI-RS resource identifier. The target cell 104b can take an informed decision for data scheduling to the UE 102 based on the CSI feedback thus avoiding the data degradation and avoiding worsening of the TCP performance. The target cell 104b indicates (522) the best beam to the UE 102 based on the CSI feedback.

FIG. 6 is a sequence diagram depicting an alternative procedure for initial beam alignment based on CSI-RS, according to embodiments as disclosed herein. In the procedure depicted in FIG. 6, the HO is based only on MR containing RSRP of NR-SS of involved cells (i.e. Measurement Report) similar to the solution shown in FIG. 5. The CSI-RS RSRP of involved cells is not used for HO decision for the purpose of simplification of the method. This is not a restriction and the HO decision can be based either on signal strength of NR-SS measurement or the signal strength of CSI-RS measurement depending on the network configuration. The measurement report includes at least one of: measurements of best SS blocks and corresponding SS block identifier(s) i.e. beam indexes associated with the target cell. The reported NR-SS beam measurements and associated identifiers are above a pre-configured threshold which can be either a relative or absolute threshold. Further identification of N best beam(s) of the target cell 104b for initial beam alignment is based on CSI-RS set 2 configuration of target cell 104b provided in HO command. However, the difference compared to solution depicted in FIG. 5, is the UE 102 does not perform the CSI-RS measurement of the target cell 104b autonomously after the receiving the HO command. In the RAR of the RACH procedure on the target cell 104b the UE 102 is indicated (614) with a bit indication referred as CSI request bit to start measuring the CSI-RS resources of set 2. Such an indication is useful because the CSI-RS set 2 transmissions is ON/OFF transmission so the 1 bit indication indicates the activation of the CSI-RS set 2 transmissions in the target cell. Further, during HO in the target cell 104b there is no dedicated PUCCH in UL for the UE. In order to support beam selection based on CSI-RS at the earliest in the target cell the RAR includes the CSI request so that UE can report CSI feedback i.e. CQI, PMI, RI on PUSCH in UL (i.e. MSG3 of RACH procedure). After dedicated PUCCH is configured upon successful completion of RACH procedure in target cell 104b the UE continues periodic CSI feedback reporting on dedicated PUCCH resources. In an embodiment, the UE 102 may measure all CSI-resources in CSI-RS set 2 received in HO command to identify N best beam(s). In another embodiment, the UE 102 can measure (618) the subset of resources in CSI-RS set 2 corresponding to best SS block of the target cell 104b.

Even though the DL coverage beam characteristics of the NR-SS transmission and CSI-RS set 2 transmissions may or may not be same, the UE 102 can implicitly identify the subset set of CSI-RS resources to be measured from the CSI-RS configuration of the target cell based on the best beam quality corresponding to NR-SS block of the target cell 104b. The CSI feedback (620) may include the CQI, PMI, RI and the associated resource identifier corresponding to target cell 104b.

FIG. 7 is a sequence diagram depicting another alternative procedure for initial beam alignment based on CSI-RS, according to embodiments as disclosed herein. In the procedure depicted in FIG. 7, the HO is based only on MR containing RSRP of NR-SS of involved cells (i.e. Measurement Report) similar to the solution shown in FIG. 5. The CSI-RS RSRP of involved cells is not used for HO decision for the purpose of simplification of the method. This is not a restriction and the HO decision can be based either on signal strength of NR-SS measurement or the signal strength of CSI-RS measurement depending on the network configuration. The measurement report includes at least one of: measurements of best SS blocks and corresponding SS block identifier(s) i.e. beam indexes associated with the target cell. The reported NR-SS beam measurements and associated identifiers are above a pre-configured threshold which can be either a relative or absolute threshold. Further identification of N best beam(s) of the target cell 104b for initial beam alignment is based on CSI-RS set 2 configuration of the target cell 104b provided in HO command. However, the difference compared to solution depicted in FIG. 5, is the UE does not perform the CSI-RS measurement of the target cell autonomously after the receiving the HO command. In FIG. 6, the RAR of the RACH procedure includes a bit indication referred as CSI request bit to start measuring the CSI-RS resources of set 2 while in the FIG. 7, the 1 bit indication (i.e. CSI request bit) is replaced with indication (714) of the subset of CSI-RS resources the UE 102 shall measure. The indication for the subset in RAR can be based on the CSI-RS resource identifier/index indicated in the CSI-RS set 2 configuration previously provided in HO command. The DL coverage beam characteristics of the NR-SS transmission and CSI-RS set 2 transmissions may or may not be same. The UE 102 is explicitly informed to identify the subset set of CSI-RS resources to be measured (718) based on the indication/information in RAR from the CSI-RS configuration of the target cell 104b previously provided in HO command. The CSI feedback (720) may include the CQI, PMI, RI and the associated resource identifier corresponding to target cell 104b.

FIG. 8 is a sequence diagram depicting initial beam alignment procedure based on CSI-RS configuration in RAR, according to embodiments as disclosed herein. In the procedure depicted in FIG. 8, the HO is based only on MR containing RSRP of NR-SS of involved cells (i.e., Measurement Report) similar to the solution shown in FIG. 5. The CSI-RS RSRP of involved cells is not used for HO decision for the purpose of simplification of the method. This is not a restriction and the HO decision can be based either on signal strength of NR-SS measurement or the signal strength of CSI-RS measurement depending on the network configuration. The measurement report includes at least one of: measurements of best SS blocks and corresponding SS block identifier(s) i.e. beam indexes associated with the target cell. The reported NR-SS beam measurements and associated identifiers are above a pre-configured threshold which can be either a relative or absolute threshold. Further in FIGS. 5, 6 and 7 the identification of best beam of target cell 104b for initial beam alignment is based on CSI-RS set 2 configuration of target cell 104b provided in HO command. However the solution depicted in FIG. 8 the identification of N best beam(s) of target cell for initial beam alignment is based on CSI-RS set 2 configuration of target cell provided in RAR (814) during the RACH procedure initiated on the target cell 104b. The RACH procedure towards the target cell 104b can be either contention free or contention based. The UE 102 is explicitly informed to measure the subset set of CSI-RS resources (814) based on the CSI-RS configuration of the target cell 104b provided in RAR. In an embodiment, the UE 102 can measure the subset of resources in CSI-RS set 2 corresponding to best SS block of the target cell 104b. In an alternative embodiment, UE 102 may measure all CSI-resources in CSI-RS set 2 received in RAR to identify N best beam(s). The CSI feedback (818) may include the CQI, PMI, RI and the associated resource identifier corresponding to target cell 104b.

FIG. 9 is a sequence diagram depicting initial beam alignment procedure based on CSI-RS configuration in System Information, according to embodiments as disclosed herein. In the procedure depicted in FIG. 9, the HO is based only on MR containing RSRP of NR-SS of involved cells (i.e. Measurement Report) similar to the solution shown in FIG. 5. The CSI-RS RSRP of involved cells is not used for HO decision for the purpose of simplification of the method. This is not a restriction and the HO decision can be based either on signal strength of NR-SS measurement or the signal strength of CSI-RS measurement depending on the network configuration. Further in FIGS. 5, 6 and 7 the identification of N best beam(s) of target cell 104b for initial beam alignment is based on CSI-RS set 2 configuration of target cell 104b provided in HO command. However the solution depicted in FIG. 9 the identification of N best beam(s) of target cell 104b for initial beam alignment is based on CSI-RS set 2 configuration of target cell 104b acquired by the UE 102 by reading (912) system information of the target cell 104b. The UE 102 is required to acquire the System Information block (SIB) from cell broadcast comprising the CSI-RS set 2 configuration. The CSI-RS configuration includes at least the cell-specific signal time windows (period, offset, duration), referred to as CSI-RS Measurement Timing Configuration, a list of configurations that includes CSI-RS resource identity, PCI, scrambling Identity, resource configuration including non-zero power (NZP) resources, zero power (ZP) resources and interference measurement (IM) resources, subframe offset as well as a Qoffset. In the procedure depicted in FIG. 9, the UE 102 assumes after receiving the HO command that the target cell 104*b* should periodically broadcast the SIB containing CSI-RS set 2 configuration. There are several options to measure the CSI-RS resources. In one option based on the 1-bit indication referred as CSI request in RAR. The UE 102 then measures all the CSI-RS resources of the CSI-RS set 2 acquired from System Information. In another embodiment, based on the subset indication in RAR, UE 102 measures only a subset of CSI-RS resources of the CSI-RS set 2 acquired from System Information. The UE 102 is explicitly informed to identify the subset set of CSI-RS resources to be measured (918) based on the indication/information in RAR from the CSI-RS configuration of the target cell 104*b* acquired from System information. In yet another embodiment, based on the 1-bit indication (i.e. CSI request) in RAR, the UE 102 measures only a subset of CSI-RS resources of the CSI-RS set 2 acquired from System Information based on best NR-SS block. The UE 102 either measures the CSI-RS resources of the CSI-RS set 2 acquired from System Information autonomously or based on the indication in RAR (918). The CSI feedback (920) sent on MSG3 in UL i.e. PUSCH transmission may include the CQI, PMI, RI and the associated resource identifier corresponding to target cell 104*b*. In an embodiment, the best/suitable CSI-RS resource identifier is indicated in MSG1 wherein UE transmit MSG1 (PRACH preamble) using the dedicated preamble and/or resources corresponding to CSI-RS resource identifier.

FIG. 10 is another sequence diagram depicting the initial beam alignment procedure based on CSI-RS configuration in System Information, according to embodiments as disclosed herein. In the procedure depicted in FIG. 10, the HO is based only on MR containing RSRP of NR-SS of involved cells (i.e. Measurement Report) similar to the solution shown in FIG. 5. The CSI-RS RSRP of involved cells is not used for HO decision. Further in FIGS. 5, 6 and 7 the identification of N best beam(s) of target cell 104*b* for initial beam alignment is based on CSI-RS set 2 configuration of target cell 104*b* provided in HO command. Compared to the solution depicted in FIG. 9, the solution in FIG. 10 the identification of N best beam(s) of the target cell 104*b* for initial beam alignment is based on CSI-RS set 2 configuration of the target cell 104*b* is acquired by the UE 102 by requesting the SIB though on demand manner from the target cell. Normally the RACH during HO procedure is contention free RACH where the PRACH resources and preamble is reserved. Since the target cell 104*b* provides the PRACH resource reservation information it identifies that the UE 102 is requesting CSI-RS set 2 configuration on decoding the reserved preamble. The target cell 104*b* starts broadcasting the SIB containing the CSI-RS set 2 configuration. The UE 102 is required to acquire the System Information block (SIB) from cell broadcast comprising the CSI-RS set 2 configuration after transmitting the PRACH preamble. In the procedure depicted in FIG. 10, the UE 102 does not assume that the target cell 104*b* should periodically broadcast the SIB containing CSI-RS set 2 configuration after receiving the HO command. Further, the UE 102 may receive in RAR (1018) either 1 bit indication to measure CSI-RS resources or indication of the subset of CSI-RS resources to be measured. In an embodiment, based on the 1-bit indication in RAR, the UE 102 then measures all the CSI-RS resources of the CSI-RS set 2 acquired from System Information. In another embodiment, based on the subset indication in RAR, the UE 102 measures only a subset of CSI-RS resources of the CSI-RS set 2 acquired from System Information. In yet another embodiment, based on the 1-bit indication in RAR. The UE 102 measures (1022) only a subset of CSI-RS resources of the CSI-RS set 2 acquired from System Information based on best NR-SS block.

FIG. 11 is another sequence diagram depicting initial beam alignment procedure during connection setup/establishment, according to embodiments as disclosed herein. In the procedure depicted in FIG. 11, the initial beam alignment procedure is shown for the UE 102 transition from idle/inactive state to connected state i.e. during connection setup/establishment. The UE 102 during idle/inactive state can assume only the presence of NR-SS so the UE 102 can measure the NR-SS block RSRP i.e. beam quality of several NR-SS blocks belonging to the NR-SS burst. The UE 102 can derive cell quality RSRP by consolidating of the beam quality, and the cell quality metric can be used for ranking detected cells during cell re-selection procedure. When the UE 102 decides to transition to connected state e.g. data packet arrives in UE buffer or the UE 102 is paged by the network then it would be desirable, the UE is scheduled at the earliest with the best beam to achieve the high data rate i.e. Gbps data rate achievable on NR PHY layer. One possible solution is the initial beam alignment can be achieved based on the NR-SS block level measurement which corresponds to DL gNB beam quality. The NR-SS block measurements can be considered beam measurements associated with Beam-Id based on implicitly (e.g. time index) or explicitly (e.g. beam index sequence detection) indexing the NR-SS blocks. The UE 102 can indicate the best beam for NR-SS reception by transmitting the preamble on the PRACH resource mapped Beam-Id. Either there is mapping of preamble to Beam-Id or PRACH resource to Beam-Id mapping. Assuming channel reciprocity the UE 102 transmits the preamble with the UE 102 Tx beam in the same direction of the detected DL gNB best beam. Under the assumption of channel reciprocity, initial beam alignment is possible based on RACH procedure having mapping of PRACH resources to Beam-Id. However, if channel reciprocity does not hold then beam characteristics of NR-SS block transmission may not be correlated with the beam characteristics of dedicated beams for data scheduling.

An alternative solution is that the UE 102 acquires the CSI-RS configuration from system information. Since system information can either be periodically broadcasted or provided on-demand manner based on UE request, the UE 102 can take appropriate action to acquire the CSI-RS configuration.

In FIG. 11, the UE 102 sends (1106) the preamble reserved for system information request. If the CSI-RS set 2 is already transmitted in the cell for other connected UEs then based on the UE system information request, the serving cell 104*a* starts (1108) broadcasting the CSI-RS configuration in respective system information block. The UE reads (1110) the CSI-RS configuration from cell broadcast based on the scheduling information for system information. In the RAR (1112), the serving cell 104*a* can indicate the UE 102 to start measuring the CSI-RS set 2 resources. Optionally the RAR can also indicate the subset of CSI-RS resources to be measured. There are several options to measure the CSI-RS resources. In an embodiment, based on the 1-bit indication in RAR, the UE measures all the CSI-RS resources of the CSI-RS set 2 acquired from System Information. In another embodiment, based on the subset indication in RAR, the UE 102 measures only a subset of CSI-RS resources of the CSI-RS set 2 acquired from System Information. In yet another embodiment based on the 1-bit indication in RAR, the UE 102 measures (1114) only a subset of CSI-RS resources of the CSI-RS set 2 acquired from System Information based on best NR-SS block. The UE 102 either measures the CSI-RS resources of the CSI-RS set 2 acquired from System Information autonomously or based on the indication in RAR. After measuring the CSI-RS RSRP corresponding the CSI-RS resource subset the best CSI-RS resource index is indicated to the serving cell in MSG3 (1116) as CSI feedback. Based on the UE CSI feedback the serving cell 104*a* takes the information into account for initial beam alignment for data scheduling.

FIG. 12 is a block diagram illustrating various modules of the UE, according to an embodiment as disclosed herein. The primary blocks present for communication include a communication module 1202, a control signaling module 1204, a processor module 1206, a memory module 1208, a radio resource management module 1210 and a display module 1212. In an embodiment, the communication module 1202 is configured to decode the synchronization signal, the beam index sequence, PBCH and SBCH broadcasted by 5G eNB. In an embodiment, the communication module 1202 is configured to communicate RRC signaling to and from the 5G eNB 103. For example, the wireless communication module 1202 in the UE 102 can be configured to communicate the measurement report and RRC reconfiguration complete message to the 5G eNB 103. Further, the communication module 1202 in the UE 102 can perform initial beam alignment during random access procedure on the cell of the next generation RAT served by the 5G eNB 103. Further, the communication module 1202 in the UE 102 can be configured to transmit and receive data from the 5G eNB 103 according to physical layer waveform and coding assumed for next generation wireless system. The control signaling module 1204 in the UE 102 can be configured to prepare the related RRC messages to be transmitted to the 5G eNB 103 and also can be configured to parse the related RRC message received from the 5G eNB 103. The processor module 1206 depicts a computing environment in the UE 102 for implementing a method of performing initial beam alignment during the random access procedure in the next generation wireless system 100, The computing environment of 1206 comprises at least one processing unit that is equipped with a control unit and an Arithmetic Logic Unit (ALU), a clock chip, plurality of networking devices, and a plurality Input output (I/O) devices. The processor module 1206 is responsible for processing the instructions of the algorithm. The processing unit receives commands from the control unit in order to perform its processing. Further, any logical and arithmetic operations involved in the execution of the instructions are computed with the help of the ALU. The overall computing environment can be composed of multiple homogeneous or heterogeneous cores, multiple CPUs of different kinds, special media and other accelerators. The processing unit is responsible for processing the instructions of the algorithm. The algorithm comprising of instructions and codes required for the implementation are stored in either the memory module 1208 or the storage or both. At the time of execution, the instructions may be fetched from the corresponding memory module 1208 or storage unit, and executed by the processing unit. The processing unit synchronizes the operations and executes the instructions based on the timing signals generated by the clock chip. The embodiments of the present disclosure disclosed herein can be implemented through at least one software program running on at least one hardware device and performing network management functions to control the elements. Further, the memory module 1208 is also configured to store information related to UE operation. The radio resource management module 1210 in the UE 102 is responsible for various aspects like cell level mobility and beam level mobility etc. The radio resource management module 1210 in the UE 102 may be configured to evaluate the cell selection/re-selection handover events based on the CSI-RS measurements and perform CSI-RS RSRP measurements respectively. The display module 1212 in the UE 102 can be configured so that user can input information or information can output on the display for the user to understand some UE 102 operations when the UE 102 is operating in dual connectivity mode of operation. Most of the UE 102 operations are transparent to the user and may not need user input nor output on the display.

The embodiments disclosed herein can be implemented through at least one software program running on at least one hardware device and performing network management functions to control the elements. The elements shown in FIGS. 2 through 12 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method of performing initial beam alignment during a random access procedure by a terminal, the method comprising:
   transmitting, on a serving cell, a measurement report message including beam measurement information associated with a target cell, in response to a measurement reporting event triggered;
   receiving, on a serving cell, a handover command message including a resource configuration of channel state information reference signals (CSI-RSs) associated with the target cell for an initial access beam alignment;
   performing downlink (DL) synchronization with the target cell based on synchronization signal (SS) blocks; and
   transmitting, on the target cell, a random access preamble corresponding to a CSI-RS which is selected from the CSI-RSs by measuring a subset of the CSI-RSs transmitted on the target cell, the selected CSI-RS corresponding to a best beam of the target cell.

2. The method of claim 1, wherein the measurement report message includes at least one of a physical cell ID of the target cell, an identifier of an SS block associated with the best beam of the target cell, or an identifier of a CSI-RS associated with the best beam of the target cell.

3. The method of claim 1, wherein the resource configuration of the CSI-RSs for the target cell includes at least one of: resource configuration for non-zero power (NZP) CSI-RSs for the target cell and resource configuration for interference measurement (IM) CSI-RSs.

4. A terminal for performing initial beam alignment during a random access procedure, the terminal comprising:
   a transceiver; and a processor coupled with the transceiver and configured to control to:
- control the transceiver to transmit, on a serving cell, a measurement report message including beam measurement information associated with a target cell, in response to a measurement reporting event triggered,
- control the transceiver to receive, on the serving cell, a handover command message including a resource configuration of channel state information reference signals (CSI-RSs) associated with the target cell for an initial access beam alignment,
- perform downlink (DL) synchronization with the target cell on synchronization signal (SS) blocks, and
- control the transceiver to transmit, on the target cell, a random access preamble corresponding to a CSI-RS which is selected from the CSI-RSs by measuring a subset of the CSI-RSs transmitted on the target cell, the selected CSI-RS corresponding to a best beam of the target cell.

5. The terminal of claim 4, wherein the measurement report message includes at least one of a physical cell ID of the target cell, an identifier of an SS block associated with the best beam of the target cell, or an identifier of a CSI-RS associated with the best beam of the target cell.

6. The terminal of claim 4, wherein of the CSI-RSs for the target cell includes at least one of: resource configuration for non-zero power (NZP) CSI-RSs for the target cell and resource configuration for interference measurement (IM) CSI-RSs.

7. A method by a source base station, the method comprising:
- receiving, on a serving cell from a terminal, a measurement report message including beam measurement information associated with a target cell, in response to a measurement reporting;
- obtaining, from a target base station, a radio resource control (RRC) reconfiguration message of the target cell to perform a handover; and
- transmitting, on the serving cell to the terminal, a handover command message including resource configuration of channel state information reference signals (CSI-RSs) associated with the target cell for an initial access beam alignment, based on the obtained RRC reconfiguration message of the target cell,
- wherein a random access preamble transmitted from the terminal to the target cell corresponds to a CSI-RS which is selected from the CSI-RSs by measuring a subset of the CSI-RSs transmitted on the target cell, the selected CSI-RS corresponding to a best beam of the target cell.

8. A method by a target base station, the method comprising:
- delivering a radio resource control (RRC) reconfiguration message of a target cell to a source base station based on a handover request from the source base station; and
- receiving, on the target cell from a terminal, a random access preamble corresponding to a channel state information reference signal (CSI-RS) which is selected from CSI-RSs by measuring a subset of the CSI-RSs transmitted on the target cell, the selected CSI-RS corresponding to a best beam of the target cell,
- wherein a measurement report message including beam measurement information associated with the target cell is transmitted, on a serving cell, from the terminal to the source base station, and
- wherein the random access preamble is received after a handover command message including resource configuration of the CSI-RSs associated with the target cell for an initial access beam alignment is transmitted on a serving cell from the source base station to the terminal based on the delivered RRC reconfiguration message of the target cell.

9. A source base station, comprising:
a communicator; and
a processor coupled with the communicator and configured to control to:
- receive, on a serving cell from a terminal, a measurement report message including beam measurement information associated with a target cell, in response to a measurement reporting,
- obtain, from a target base station, a radio resource control (RRC) reconfiguration message of the target cell to perform a handover, and
- transmit, on the serving cell to the terminal, a handover command message including resource configuration of channel state information reference signals (CSI-RSs) associated with the target cell for an initial access beam alignment, based on the obtained RRC reconfiguration message of the target cell,
- wherein a random access preamble transmitted from the terminal to the target cell corresponds to a CSI-RS which is selected from the CSI-RSs by measuring a subset of the CSI-RSs transmitted on the target cell, the selected CSI-RS corresponding to a best beam of the target cell.

10. A target base station, comprising:
a communicator; and
a processor coupled with the communicator and configured to control to:
- deliver a radio resource control (RRC) reconfiguration message of a target cell to a source base station based on a handover request from the source base station, and
- receive, on the target cell from a terminal a random access preamble corresponding to a channel state information reference signal (CSI-RS) which is selected from CSI-RSs by measuring a subset of the CSI-RSs transmitted on the target cell, the selected CSI-RS corresponding to a best beam of the target cell,
- wherein a measurement report message including beam measurement information associated with the target cell is transmitted, on a serving cell, from the terminal to the source base station, and
- wherein the random access preamble is received after a handover command message including resource configuration of the CSI-RSs associated with the target cell for an initial access beam alignment is transmitted on a serving cell from the source base station to the terminal based on the delivered RRC reconfiguration message of the target cell.

* * * * *